United States Patent
Alshan et al.

(10) Patent No.: US 12,430,914 B1
(45) Date of Patent: Sep. 30, 2025

(54) GENERATING SUMMARIES OF EVENTS BASED ON SOUND INTENSITIES

(71) Applicant: Amazon Technologies, Inc., Seattle, WA (US)

(72) Inventors: Eli Alshan, Kfar-Saba (IL); Gilad Cohen, Raanana (IL); Ido Yerushalmy, Tel-Aviv (IL)

(73) Assignee: Amazon Technologies, Inc., Seattle, WA (US)

( * ) Notice: Subject to any disclaimer, the term of this patent is extended or adjusted under 35 U.S.C. 154(b) by 7 days.

(21) Appl. No.: 18/186,533

(22) Filed: Mar. 20, 2023

(51) Int. Cl.
| | | |
|---|---|---|
| G06F 16/78 | (2019.01) | |
| G06F 16/783 | (2019.01) | |
| G06F 16/787 | (2019.01) | |
| G06V 20/40 | (2022.01) | |

(52) U.S. Cl.
CPC ......... *G06V 20/47* (2022.01); *G06F 16/7834* (2019.01); *G06F 16/7867* (2019.01); *G06F 16/787* (2019.01); *G06V 20/42* (2022.01)

(58) Field of Classification Search
USPC ....................................... 386/241, 248, 278
See application file for complete search history.

(56) References Cited

U.S. PATENT DOCUMENTS

| | | | |
|---|---|---|---|
| 5,351,075 A | 9/1994 | Herz et al. | |
| 6,018,768 A | 1/2000 | Ullman et al. | |
| 6,457,010 B1 | 9/2002 | Eldering et al. | |
| 6,760,916 B2 | 7/2004 | Holtz et al. | |
| 7,493,636 B2 | 2/2009 | Kitsukawa et al. | |
| 7,752,642 B2 | 7/2010 | Lemmons | |
| 8,627,379 B2 | 1/2014 | Kokenos et al. | |
| 8,630,844 B1* | 1/2014 | Nichols | G06F 40/151 |
| | | | 706/46 |
| 8,949,890 B2 | 2/2015 | Evans et al. | |
| 9,697,178 B1* | 7/2017 | Nichols | G06F 40/56 |
| 10,363,488 B1 | 7/2019 | Willette et al. | |
| 2003/0028873 A1 | 2/2003 | Lemmons | |
| 2007/0029112 A1 | 2/2007 | Li et al. | |
| 2008/0037951 A1 | 2/2008 | Cho et al. | |

(Continued)

OTHER PUBLICATIONS

Dosovitskiy, Alexey, Lucas Beyer, Alexander Kolesnikov, Dirk Weissenborn, Xiaohua Zhai, Thomas Unterthiner, Mostafa Dehghani et al. "An image is worth 16×16 words: Transformers for image recognition at scale." arXiv preprint arXiv:2010.11929 (2020) Jun. 3, 2021. URL: https://arxiv.org/abs/2010.11929, 22 pages.

(Continued)

*Primary Examiner* — Nigar Chowdhury
(74) *Attorney, Agent, or Firm* — Athorus, PLLC

(57) ABSTRACT

Summaries of broadcasts of live events are generated based on intensities of audio signals captured during the live events. Streams of multimedia including video signals and audio signals are captured by one or more cameras. The video signals are processed to identify specific activities of interest (e.g., plays of a sporting event) during the live event. Audio signals captured concurrently with the video signals are processed to determine their respective intensities or other acoustic characteristics. The activities of interest are ranked based on intensities of the audio signals. A multimedia stream representing a summary of a media program and includes the highest-ranking video signals and corresponding audio signals is generated and transmitted to one or more devices of viewers.

13 Claims, 20 Drawing Sheets

VIDEO SIGNALS AND AUDIO SIGNALS REPRESENTING HIGHEST-RANKING ACTIVITIES OR EVENTS OF INTEREST

(56) References Cited

U.S. PATENT DOCUMENTS

| | | | |
|---|---|---|---|
| 2010/0050202 A1 | 2/2010 | Kandekar et al. | |
| 2011/0217019 A1* | 9/2011 | Kamezawa | H04N 5/907 386/E5.069 |
| 2015/0248917 A1* | 9/2015 | Chang | G11B 27/031 386/282 |
| 2016/0065884 A1* | 3/2016 | Di Censo | G06F 3/005 386/227 |
| 2016/0117928 A1* | 4/2016 | Hodges | G06F 3/04842 701/99 |
| 2016/0117940 A1* | 4/2016 | Gomory | G09B 19/04 434/262 |
| 2016/0225410 A1* | 8/2016 | Lee | H04N 21/26258 |
| 2016/0321506 A1* | 11/2016 | Fridental | H04N 7/181 |
| 2017/0099526 A1 | 4/2017 | Hua et al. | |
| 2017/0201779 A1* | 7/2017 | Publicover | H04N 21/4532 |
| 2017/0259115 A1* | 9/2017 | Hall | G16H 40/67 |
| 2017/0266491 A1* | 9/2017 | Rissanen | G09B 19/003 |
| 2018/0084291 A1 | 3/2018 | Wei et al. | |
| 2019/0356948 A1* | 11/2019 | Stojancic | G06V 20/48 |
| 2020/0097502 A1* | 3/2020 | Trim | G06F 16/24578 |
| 2022/0067384 A1* | 3/2022 | Kaushik | G06N 3/044 |

OTHER PUBLICATIONS

Frome, Andrea, Greg S. Corrado, Jon Shlens, Samy Bengio, Jeff Dean, Marc'Aurelio Ranzato, and Tomas Mikolov. "DeViSE: A deep visual-semantic embedding model." Advances in Neural Information Processing Systems 26 (2013). URL: https://proceedings.neurips.cc/paper_files/paper/2013/hash/7cce53cf90577442771720a370c3c723-Abstract.html.

Li, Ang, Allan Jabri, Armand Joulin, and Laurens Van Der Maaten. "Learning visual n-grams from web data." In Proceedings of the IEEE International Conference on Computer Vision, pp. 4183-4192. 2017. URL: https://openaccess.thecvf.com/content_iccv_2017/html/Li_Learning_Visual_N-Grams_ICCV_2017_paper.html.

Radford, Alec, Jong Wook Kim, Chris Hallacy, Aditya Ramesh, Gabriel Goh, Sandhini Agarwal, Girish Sastry et al. "Learning transferable visual models from natural language supervision." In International Conference on Machine Learning, pp. 8748-8763. PMLR, 2021. URL: https://proceedings.mlr.press/v139/radford21a.html.

Socher, Richard, Milind Ganjoo, Christopher D. Manning, and Andrew Ng. "Zero-shot learning through cross-modal transfer." Advances in Neural Information Processing Systems 26 (2013). 10 pages. URL: https://proceedings.neurips.cc/paper_files/paper/2013/hash/2d6cc4b2d139a53512fb8cbb3086ae2e-Abstract.html.

Vaswani, A. et al., 2017, Attention is All you Need. In Annual Conference on Neural Information Processing Systems 2017, Dec. 4-9, 2017, Long Beach, CA, USA, pp. 6000-6010, Retrieved: https://arxiv.org/pdf/1706.03762.pdf, 15 pages.

* cited by examiner

CAMERAS PROVIDE MULTIMEDIA STREAMS TO MEDIA DISTRIBUTION SYSTEM

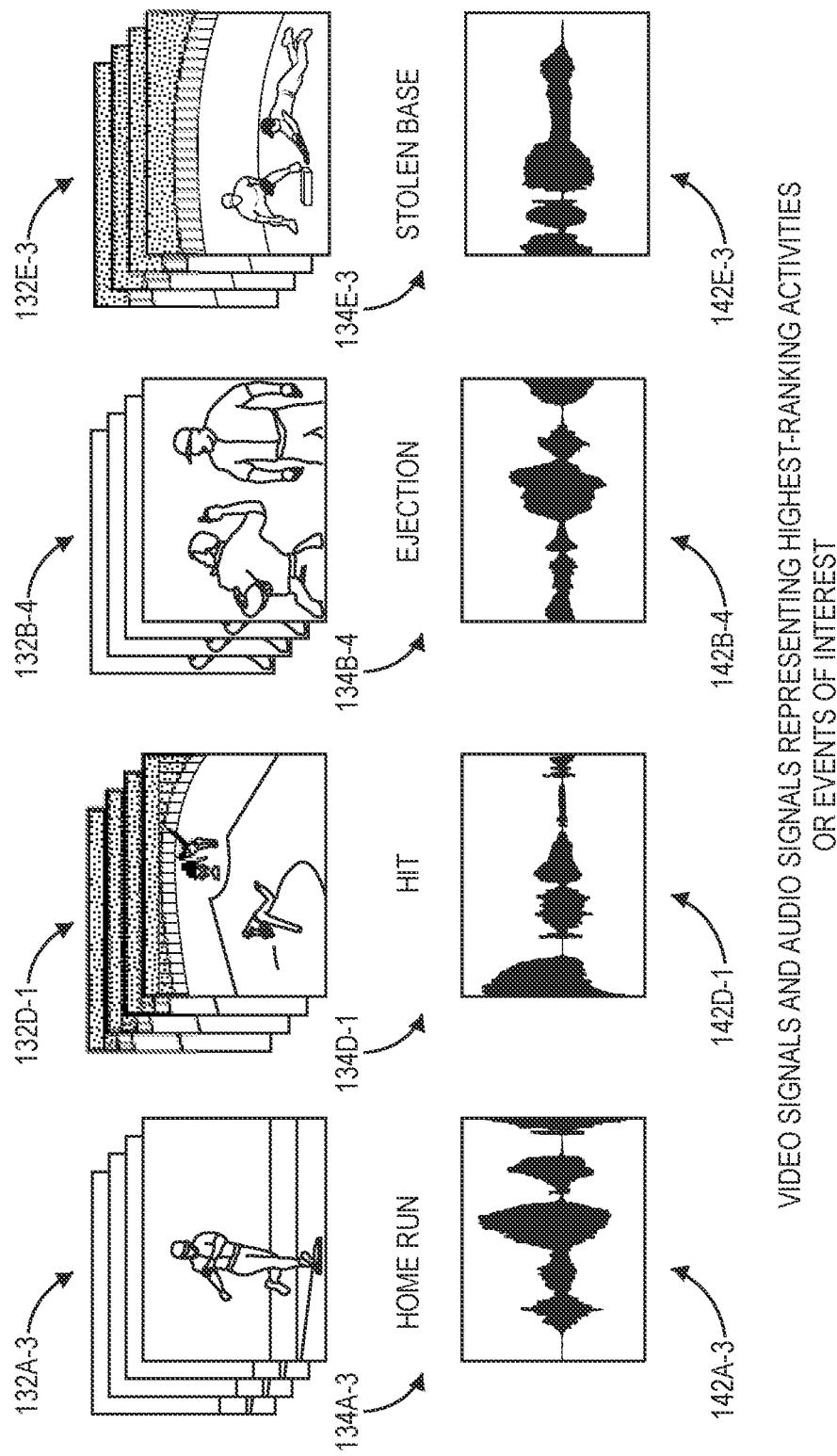

MULTIMEDIA CAPTURED DURING LIVE EVENT

VIDEO SIGNALS AND AUDIO SIGNALS REPRESENTING ACTIVITY OF INTEREST INCLUDED IN SUMMARY

GENERATING SUMMARIES OF EVENTS BASED ON SOUND INTENSITIES

BACKGROUND

Today, broadcasts of live events, such as sporting events, are some of the most popular media programs that are made available to viewers in broadcast or streaming formats. For example, by some estimates, the thirty most-watched media programs in the United States in 2022 were broadcasts of live events, and twenty-nine of the thirty media programs were broadcasts of sporting events.

Information regarding broadcasts of live events may be relevant or germane well after the broadcasts have originally aired. For example, many broadcasts of live events are recorded and made available to viewers at later times, e.g., as a "rerun," or in an "on demand" format. Moreover, many broadcasts or live events are summarized, and a summary of the broadcast or the live event may be made available to viewers, such as in a news report or another work. For example, highlights of a sporting event may be identified and shown to viewers during a break or an intermission of the sporting event, such as between periods or at halftime, or after the sporting event has concluded.

Identifying relevant or noteworthy portions (e.g., clips) of a broadcast of a live event for inclusion in a summary (or a synopsis) of the broadcast or the live event is a challenging and sometimes labor-intensive task, however. Typically, such portions are identified by humans who viewed the broadcast or the live event and tagged, designated or otherwise selected such portions, or times at which such portions occurred, as relevant or noteworthy. A summary of the broadcast or the live event may then be prepared, e.g., by copying video signals and audio signals of the broadcast that depict or represent such portions, and made available to viewers on television or via one or more networked devices. Such processes are complex undertakings that ordinarily require at least one human to view each of the broadcasts, and summaries that are generated most often occur after the live events have concluded, not while the broadcasts are in progress. Where multiple broadcasts of live events occur simultaneously, the number of humans or the amount of time required to generate summaries of each of such broadcasts or such live events may be significant.

BRIEF DESCRIPTION OF THE DRAWINGS

FIGS. 1A through 1L are views of aspects of one system for generating summaries of events in accordance with implementations of the present disclosure.

DETAILED DESCRIPTION

As is set forth in greater detail below, the present disclosure is directed to systems and methods for generating summaries of broadcasts of live events, e.g., sporting events, or others. More specifically, where a multimedia stream representing a broadcast of video signals and audio signals captured during a live event is identified and transmitted to devices of viewers, the multimedia stream may be divided into scenes, or discrete portions of the live event that occurred at specific times or involved specific actors. Scenes depicting activities or events of interest may be identified based on the video signals of the multimedia streams, and audio signals that were captured concurrently with the video signals, or have been synchronized with the video signals, may be processed to determine intensities, power levels, or other acoustic characteristics of the audio signals throughout such activities or events, or at or near conclusions of such activities or events.

Activities or events of interest may be ranked for their respective importance, interest, notoriety, significance or value based on the intensities, the power levels or the other acoustic characteristics of the audio signals. A selected number of the highest-ranking activities or events of interest may be identified, and a summary (or a synopsis) of the broadcast of the live event including the video signals and audio signals representing the highest-ranking activities or events may be generated accordingly. The summary (or the synopsis) may be generated at any point during or after a live event, without requiring manual selections or designations of portions of the live event, thereby reducing costs and enhancing objectivity and relevance associated with the generation of such summaries or synopses, which may be stored and transmitted or otherwise provided to viewers, e.g., in a subsequent or concurrent broadcast over the air, in an online streaming, or in any other manner.

Figure 1A:
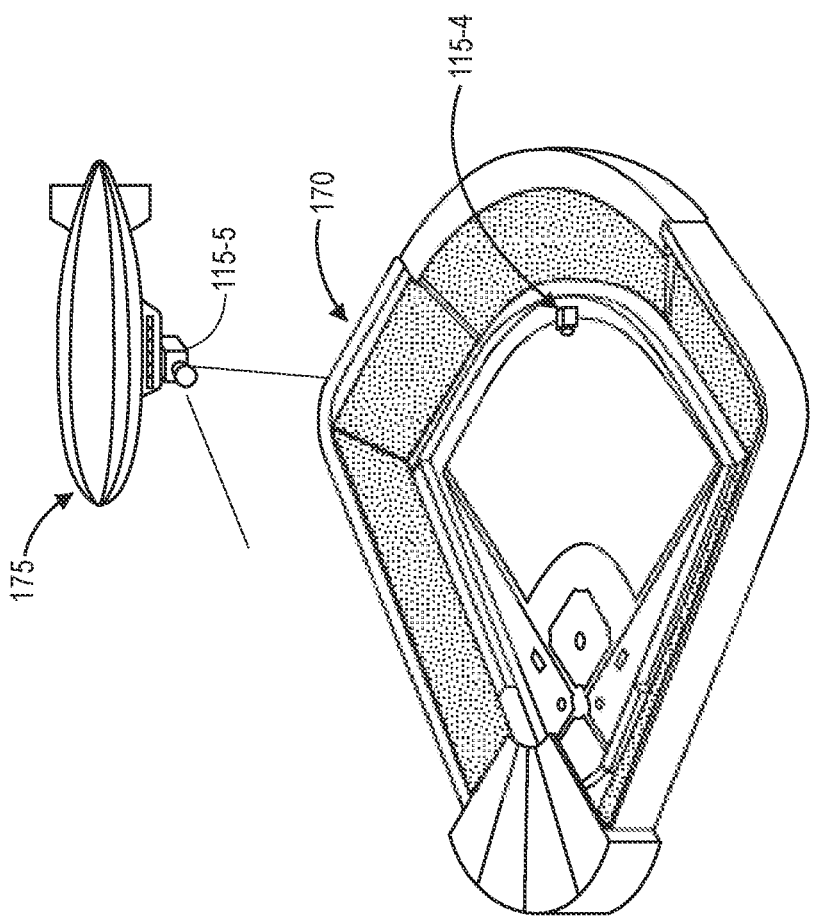
Figure 1A:
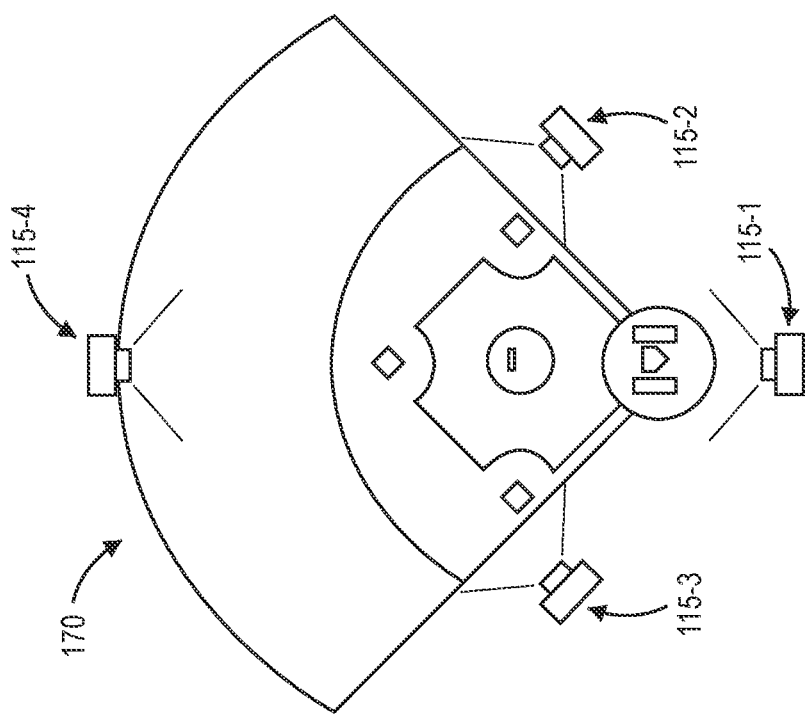

Referring to FIGS. 1A through 1L, views of aspects of one system 100 for generating summaries of events in accordance with implementations of the present disclosure are shown. As is shown in FIG. 1A, a plurality of cameras 115-1, 115-2, 115-3, 115-4, 115-5 are aligned to capture streams of multimedia, e.g., video signals and audio signals, regarding a live event, e.g., a baseball game, occurring at a venue 170, which may be a stadium, a ballpark, or any other like facility. For example, as is shown in FIG. 1A, the camera 115-1 is mounted in an area of the venue 170 and aligned to capture streams of multimedia regarding activities or events occurring within a field of view that generally includes a portion of the venue 170 including a home plate area and batters' boxes, as well as a pitcher's mound and second base area of the venue 170. The cameras 115-2, 115-3 are mounted on opposite sides of the venue 170, and aligned to capture streams of multimedia regarding activities or events occurring within fields of view including a first base area and a third base area, respectively, of the venue 170, as well as the pitcher's mound. The camera 115-4 is mounted at an outfield portion of the venue 170 and aligned to capture streams of multimedia regarding activities or events occurring within a field of view that includes a center field area of the venue 170, as well as portions of an infield area of the venue 170. Additionally, the camera 115-5 is mounted to a dirigible 175 or another aerial vehicle (e.g., a drone) or system, and is aligned to capture streams of multimedia regarding activities or events occurring within a field of view that may be oriented vertically downward, e.g., toward the venue 170 below the dirigible 175, or in any other direction or orientation. In some implementations, any number of other recording devices or systems (e.g., imaging devices or acoustic sensors) may be provided in any number of other locations at or near the venue 170, and may be configured to capture multimedia streams regarding activities or events occurring within or in association with the venue 170. For example, in some implementations, recording devices for capturing video signals and recording devices for capturing audio signals may be separately provided in discrete locations at or in association with the venue 170.

Figure 1B:
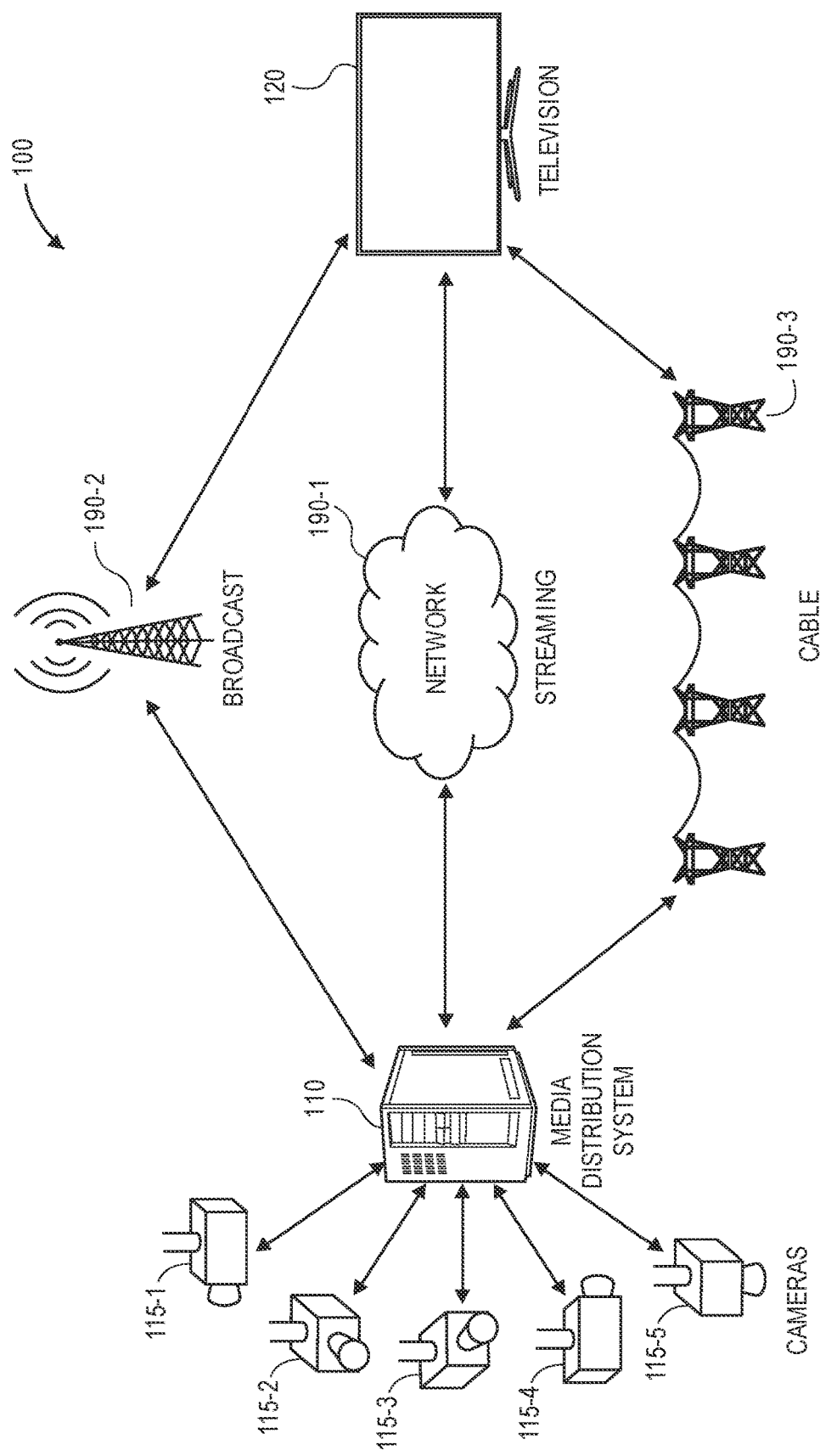

As is shown in FIG. 1B, each of the cameras 115-1, 115-2, 115-3, 115-4, 115-5 may be configured to transmit multimedia streams to a media distribution system 110 and any number of televisions 120 that may be connected to one another over a plurality of communications networks 190-1, 190-2, 190-3. Such networks may include but need not be limited to a computer network 190-1 that may include the Internet in whole or in part, a broadcast television network 190-2 or a cable television network 190-3, as well as any other types or forms of communications networks (not shown), such as a cellular telephone network. The media distribution system 110 may be any source or recipient of media programs including audio signals, visual content and/or associated information, data or metadata, or a system from which streams of such video files are made available to viewers over one or more of the networks 190-1, 190-2, 190-3. For example, the media distribution system 110 may be an online marketplace, an entertainment company, a video streaming service (e.g., a free service or a pay service), a cable television provider, an operator of an over-the-air television channel, a social network, an outlet for news or media of any kind, or any like individual or entity. The television 120 may be any system that is configured to display video content, and, optionally, air one or more accompanying audio signals. Alternatively, the television 120 may be one or more components of a computer system or device, e.g., a smartphone, a tablet computer, a laptop computer, or any other system or device having one or more processors and a display.

The media distribution system 110 may be any source or recipient of media content, e.g., still or moving images, audio content or other multimedia, by way of a networked computer infrastructure. The media distribution system 110 may include one or more physical computer servers or data stores (e.g., databases) for hosting a network site (or network sites), or for transmitting images or other video content, sounds or other audio content, or other multimedia to devices or systems of users. For example, the media distribution system 110 may be any individual or entity associated with the broadcasting, airing, streaming or distribution of one or more video and audio files over networks, which may include the Internet in whole or in part, such as an online marketplace, an entertainment company, a video streaming service, a cable television provider, an operator of an over-the-air television station or channel, a social network, an outlet for news or media of any kind, or any like individual or entity.

Figure 1C:
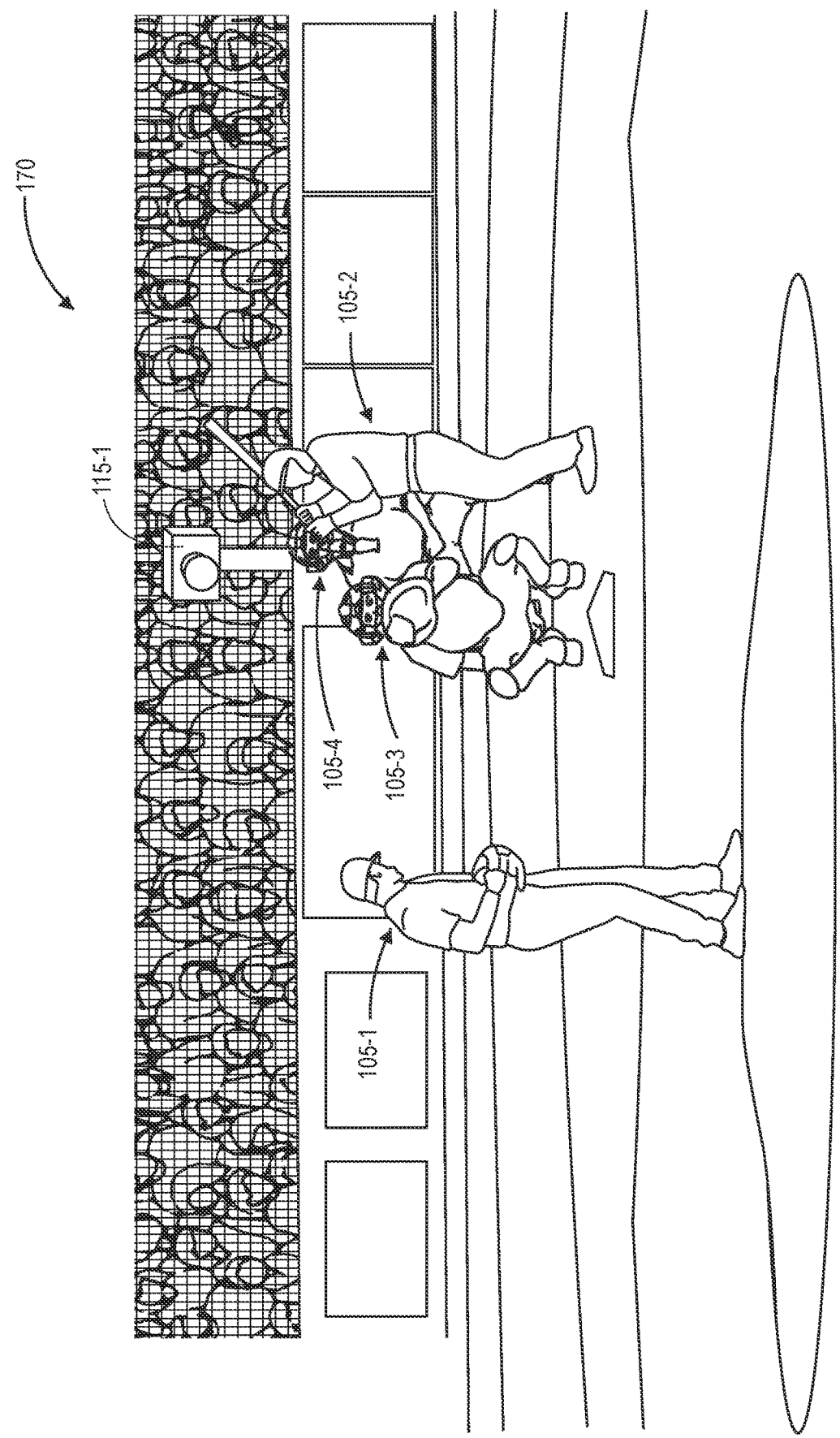

The cameras 115-1, 115-2, 115-3, 115-4, 115-5 may capture and transmit streams of multimedia during any type or form of activities or events occurring within their respective fields of view. As is shown in FIG. 1C, a field of view of the camera 115-1 includes activities or events by a pitcher 105-1, a hitter 105-2, a catcher 105-3 or an umpire 105-4, or any other individuals (e.g., humans or other animals) or machines. As is shown in FIG. 1D, a multimedia stream 125-1 captured by the camera 115-1 includes a stream of video signals 130-1 and a stream of audio signals 140-1.

Figure 1D:
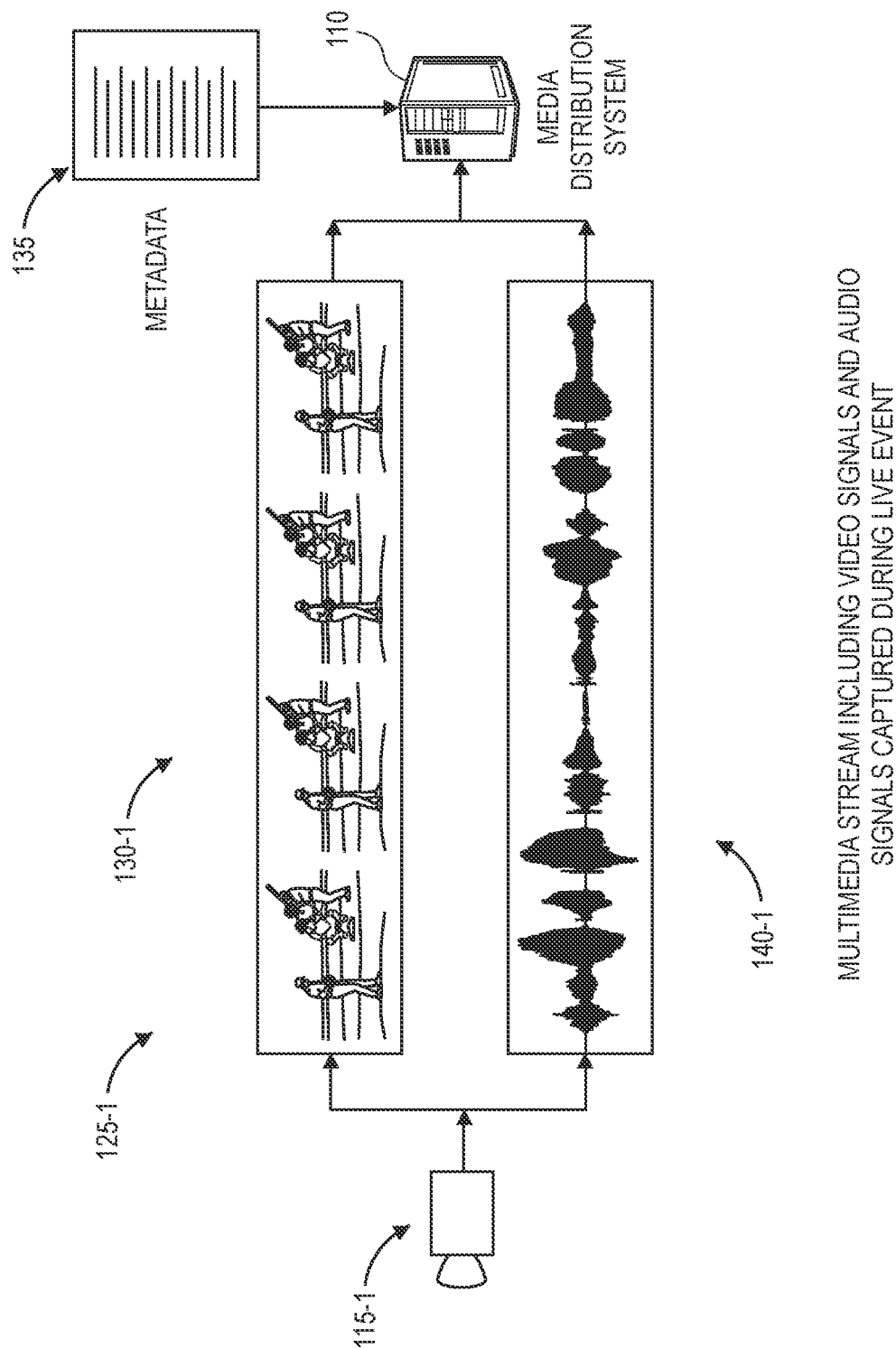

As is further shown in FIG. 1D, the media distribution system 110 may also receive or identify one or more sets of metadata 135 regarding the live event, the broadcast of the live event, the venue 170, any participants in the live event, or any activities or events of the live event. For example, the sets of metadata 135 may identify a start time and an end time of the live event, a location of the live event, as well as any participants in the live event (e.g., players, teams, or the like), or any producers of the broadcast of the live event.

The sets of metadata 135 may further identify or indicate times or durations of specific activities or events occurring during the live event, or may identify such specific activities or events. For example where the live event is a sporting event, the sets of metadata 135 may identify start times and end times of plays, as well as types of plays, names of teams or players involved in plays (e.g., in possession of a ball), statuses of or changes in status of the sporting event (e.g., players joining or departing the sporting event), or measures or indicators of success or failure of plays (e.g., whether a pass was completed, whether a serve landed inbounds, whether a shot entered a goal, or others). The sets of metadata 135 may further include descriptions or classifications of activities or events occurring during the live event, e.g., whether a play is a pass or a run, whether a serve is inbounds or out of bounds, or others, or results of such activities or events, e.g., scores, numbers of timeouts remaining, numbers of pitches thrown, or durations or distances of penalties, or others.

The sets of metadata 135 may have been generated by one or more humans, automatically, or by a combination of human-performed or automated procedures or techniques. In some implementations, the sets of metadata 135 may be processed to synchronize such sets with a time of the broadcast of the live event; to filter, remove or minimize irrelevant metadata; to compensate for time delays; to infer types of specific activities or events referenced in the sets of metadata 135 or in the multimedia stream 125-1, or for any other purpose.

Figure 1E:
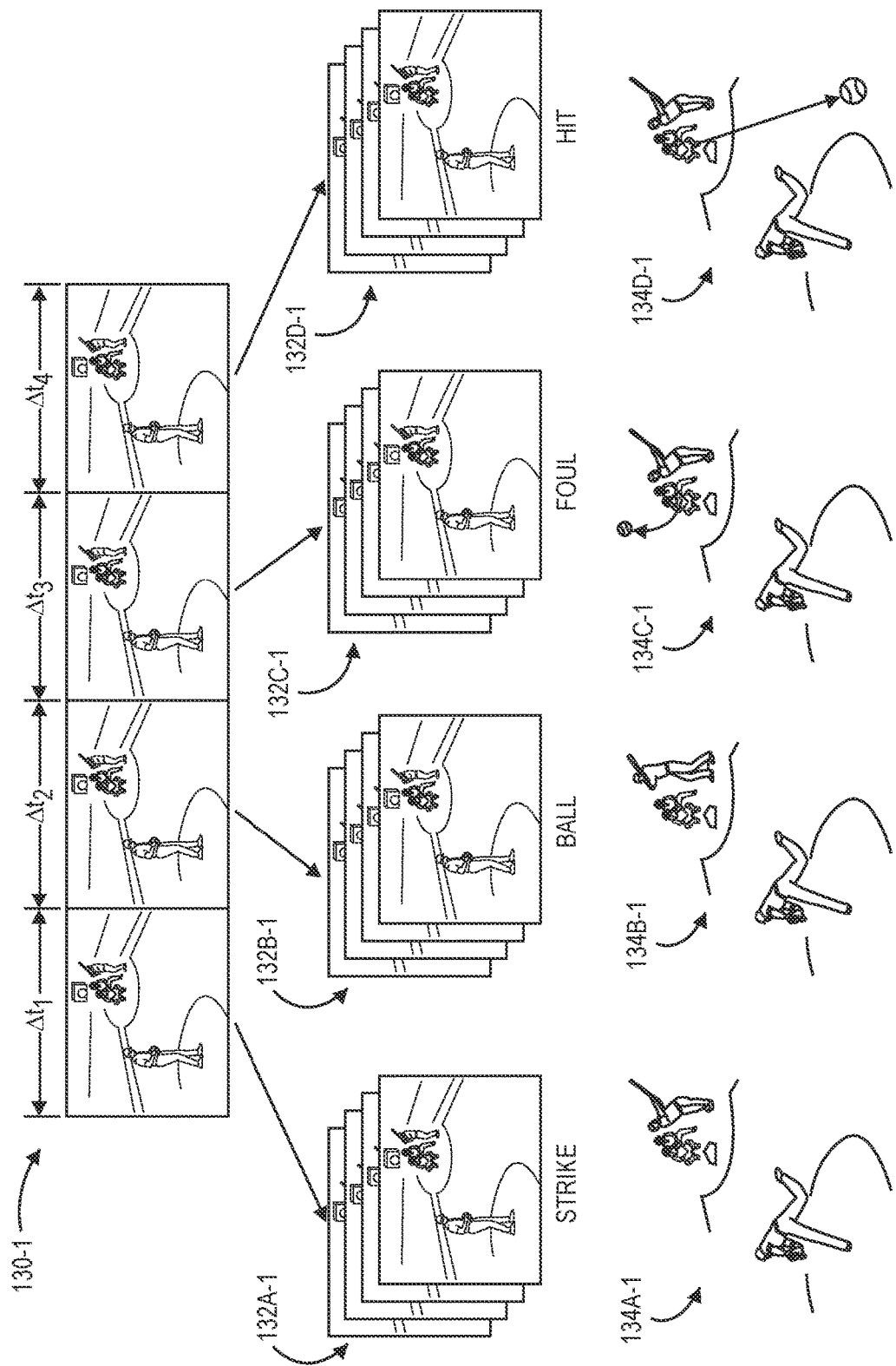

As is shown in FIG. 1E, the event distribution system 110 may process the multimedia stream 125-1 received from the camera 115-1, or from any of the other cameras, to identify portions of the multimedia stream 125-1 depicting or representing activities or events of interest. For example, as is shown in FIG. 1E, a portion of the video signals 130-1 of the multimedia stream 125-1 may be determined to include a set of video images 132A-1 depicting a strike 134A-1, e.g., an activity that occurred during an interval $\Delta t_1$ of time and includes a pitch by the pitcher 105-1 that passes through a strike zone or is swung at by the hitter 105-2 and missed. The set of video images 132A-1 may be identified in any manner, such as by identifying changes in visual content between consecutive or proximate frames, e.g., to indicate an end of a previous play including a pitch or a start of a subsequent play including a pitch, or in any other manner. Alternatively, or additionally, the set of video images 132A-1 may be identified based on one or more of the sets of metadata 135. Similarly, another portion of the video signals 130-1 of the multimedia stream 125-1 may be determined to include a set of video images 132B-1 depicting a ball 134B-1, e.g., an activity that occurred during an interval $\Delta t_2$ of time and includes a pitch by the pitcher 105-1 that does not pass through a strike zone and is not swung at by the hitter 105-2. Likewise, a portion of the video signals 130-1 of the multimedia stream 125-1 may be determined to include a set of video images 132C-1 depicting a foul ball 134C-1, e.g., an activity that occurred during an interval $\Delta t_3$ of time and includes a pitch by the pitcher 105-1 that is swung at and hit but not into fair territory by the hitter 105-2, while another portion of the video signals 130-1 of the multimedia stream 125-1 may be determined to include a set of video images 132D-1 depicting a hit 134D-1, e.g., an activity that occurred during an interval $\Delta t_4$ of time and includes a pitch by the pitcher 105-1 that is swung at and hit into fair territory by the hitter 105-2.

In some implementations, that the sets of video images 132A-1, 132B-1, 132C-1, 132D-1 depict activities or events may be determined in any manner, such as by detecting variations in content of the respective video signals, e.g., consecutive image frames or sets of images frames. In some other implementations, specific activities or events depicted within the sets of video images 132A-1, 132B-1, 132C-1, 132D-1, viz., the strike 134A-1, the ball 134B-1, the foul ball 134C-1 or the hit 134D-1, may be determined in any manner. For example, in some implementations, the sets of video images 132A-1, 132B-1, 132C-1, 132D-1 may be classified by one or more heuristic approaches, e.g., via machine learning algorithms, systems or techniques. Alternatively, in some implementations, the sets of video images 132A-1, 132B-1, 132C-1, 132D-1 may be classified based on the metadata 135. In still other implementations, that the sets of video images 132A-1, 132B-1, 132C-1, 132D-1 depict activities or events may be determined, but the individual activities or events depicted within such video signals need not be classified.

Figure 1F:
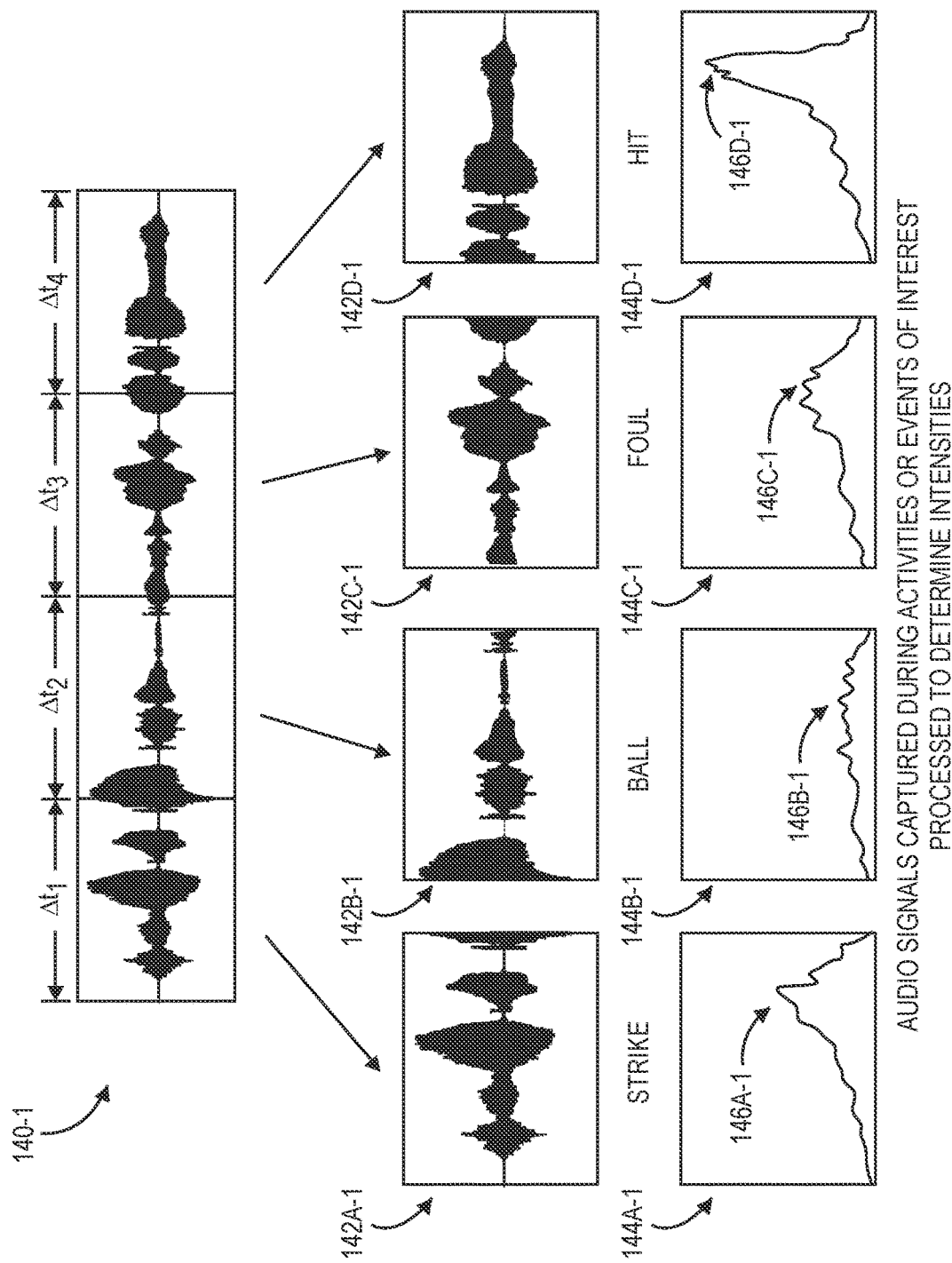

As is shown in FIG. 1F, after the sets of video images 132A-1, 132B-1, 132C-1, 132D-1 depicting the activities 134A-1, 134B-1, 134C-1, 134D-1 have been identified from the stream of video signals 130-1, the audio signals 140-1 of the multimedia stream 125-1 that were captured concurrently or simultaneously with the video signals 130-1 may be processed to determine their respective intensities (or power levels or other acoustic characteristics). For example, as is shown in FIG. 1F, a portion 142A-1 of the audio signals captured during the strike 134A-1 may be processed to determine intensities of the portion 142A-1 of such signals. In some implementations, the portion 142A-1 may be processed to determine root mean squares 144A-1 of the audio signals of the portion 142A-1, e.g., by calculating amplitudes of the audio signals of the portion 142A-1 at various times and squaring and summing the amplitudes before dividing the sum by a number of the amplitudes and calculating a square root of the sum. A maximum value 146A-1 of the root mean squares 144A-1 may be associated with the strike 134A-1 and used to determine a level of importance, interest, notoriety, significance or value of the strike 134A-1 with respect to other activities or events of the live event.

In some implementations, the portion 142A-1 of the audio signals 140-1 may be processed to determine intensities of such signals in their entirety, or to assign a level of importance, interest, notoriety, significance or value to the strike 134A-1 based on such intensities. In some implementations, however, the portion 142A-1 of the audio signals 140-1 may be processed to determine intensities of such signals over a predetermined period of time, e.g., a window or subset of a finite period of time, such as one-half second (0.5 s), and to assign a level of importance, interest, notoriety, significance or value to the strike 134A-1 based on such intensities.

Similarly, as is further shown in FIG. 1F, portions 142B-1, 142C-1, 142D-1 of the audio signals 140-1 captured during the ball 134B-1, the foul 134C-1 or the hit 134D-1, respectively, may likewise be processed to determine root mean squares 144B-1, 144C-1, 144D-1 of the audio signals of such portions, and maximum values 146B-1, 146C-1, 146D-1 of the respective root mean squares 144B-1, 144C-1, 144D-1 may be associated with the ball 134B-1, the foul 134C-1 or the hit 134D-1. Such maximum values 146B-1, 146C-1, 146D-1 may be used to determine levels of importance, interest, notoriety, significance or value of the ball 134B-1, the foul 134C-1 or the hit 134D-1 with respect to other activities or events of the live event.

In some implementations, the audio signals 140-1 of the multimedia stream 125-1 may be filtered prior to processing, in order to exclude audio signals that are likely unrelated to activities or events of interest from consideration. For example, where a portion of an audio signal has a high intensity, power level or other acoustic characteristic, but is of a sufficiently brief duration, e.g., under two seconds, the portion of the audio signal may be excluded from consideration as not likely pertaining to the live event, or not related to an activity or an event of interest.

Figure 1G:
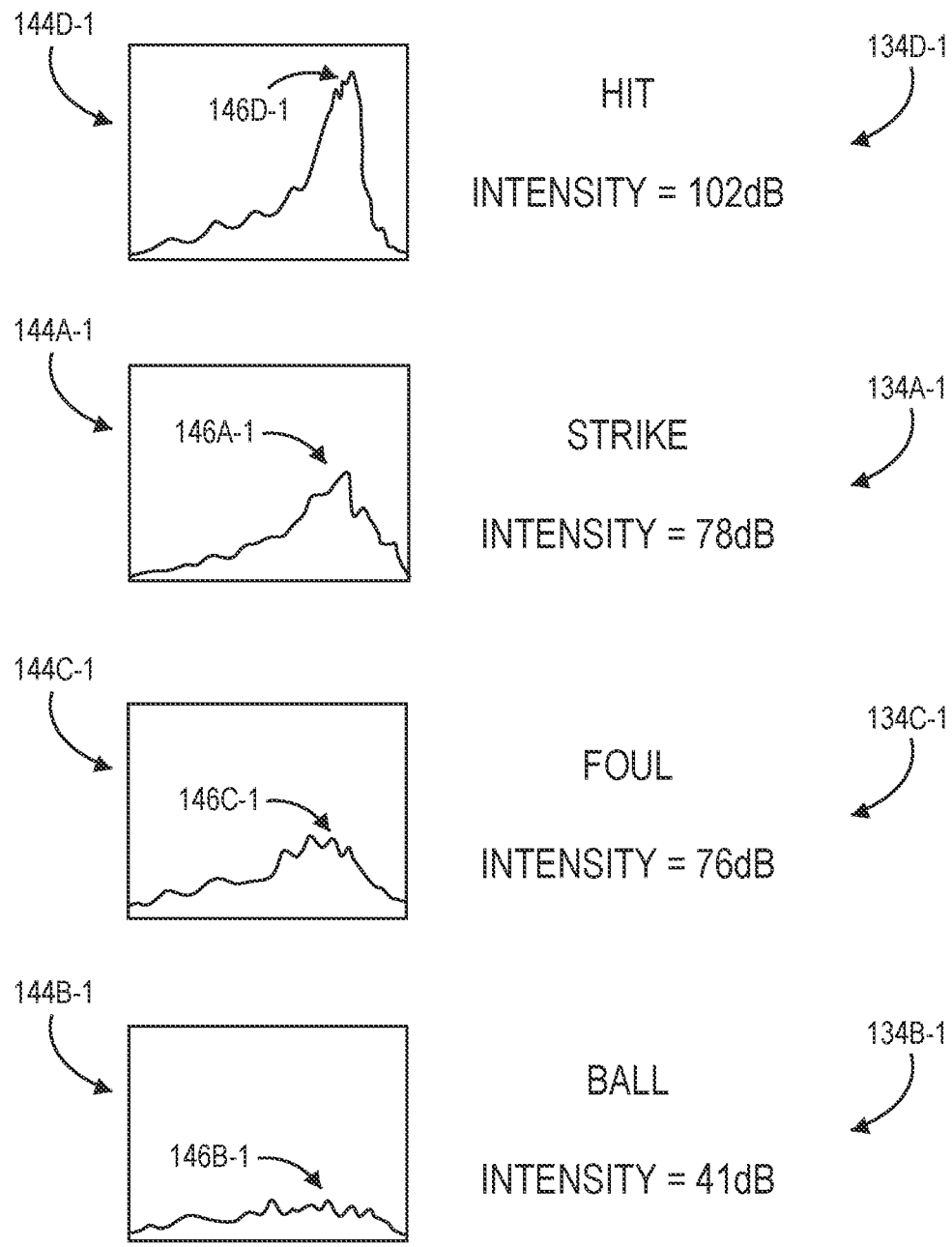

As is shown in FIG. 1G, the root mean squares 144A-1, 144B-1, 144C-1, 144D-1 are ranked based on their respective maximum values 146A-1, 146B-1, 146C-1, 146D-1. For example, the maximum value 146D-1 determined from the root mean square 144D-1 calculated based on the audio signals captured during the hit 134D-1, or 102 decibels, is a greatest one of the maximum values 146A-1, 146B-1, 146C-1, 146D-1. Similarly, the maximum value 146A-1 determined from the root mean square 144A-1 calculated based on the audio signals captured during the strike 134A-1, or 78 decibels, is a next-greatest one of the maximum values 146A-1, 146B-1, 146C-1, 146D-1, while the maximum values 146C-1, 146B-1 determined from the root mean squares 144C-1, 144B-1 calculated based on the audio signals captured during the foul 134C-1 and the ball 134B-1, respectively, or 76 and 41 decibels, respectively, are the two next-greatest ones of the maximum values 146A-1, 146B-1, 146C-1, 146D-1.

Figure 1H:
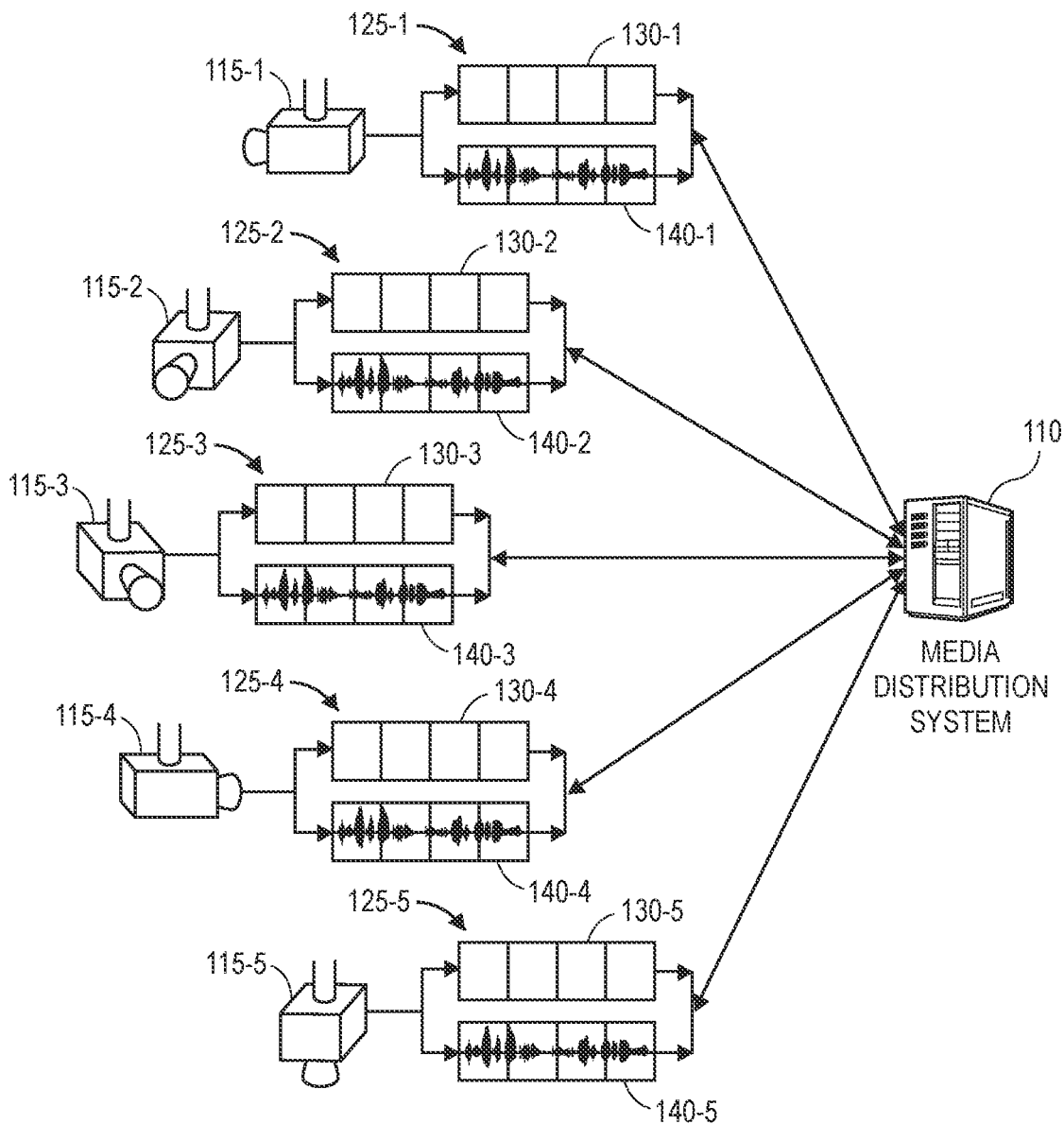

As is shown in FIG. 1H, in addition to the multimedia stream 125-1 received from the camera 115-1, multimedia streams 125-2, 125-3, 125-4, 125-5 including video signals 130-2, 130-3, 130-4, 130-5 and audio signals 140-2, 140-3, 140-4, 140-5 may also be received from the cameras 115-2, 115-3, 115-4, 115-5. Each of the multimedia streams 125-2, 125-3, 125-4, 125-5 may be synchronized, e.g., by one or more time stamps, and processed in a manner similar to that of the multimedia stream 125-1, as described above in connection with FIGS. 1D-1G, such as to identify activities or events depicted within video signals of such multimedia streams, and to process audio signals captured concurrently or simultaneously with such video signals to determine intensities, power levels or other acoustic characteristics of the audio signals. Moreover, any of the multimedia streams 125-1, 125-2, 125-3, 125-4, 125-5 may be processed to identify activities or events of interest, and multimedia streams 125-1, 125-2, 125-3, 125-4, 125-5 representing a summary (or a synopsis) of the broadcast or the live event may include any audio signals or any video signals included in any of such streams. For example, where the multimedia streams are synchronized, an activity or an event of interest may be identified based on intensities, power levels or other acoustic characteristics of audio signals included in one of the multimedia streams 125-1, 125-2, 125-3, 125-4, 125-5, and a summary (or a synopsis) of the broadcast of the live event may include audio signals and/or video signals included in one of the multimedia streams 125-1, 125-2, 125-3, 125-4, 125-5 other than the multimedia stream from which the activity or event of interest was identified.

Figure 1I:
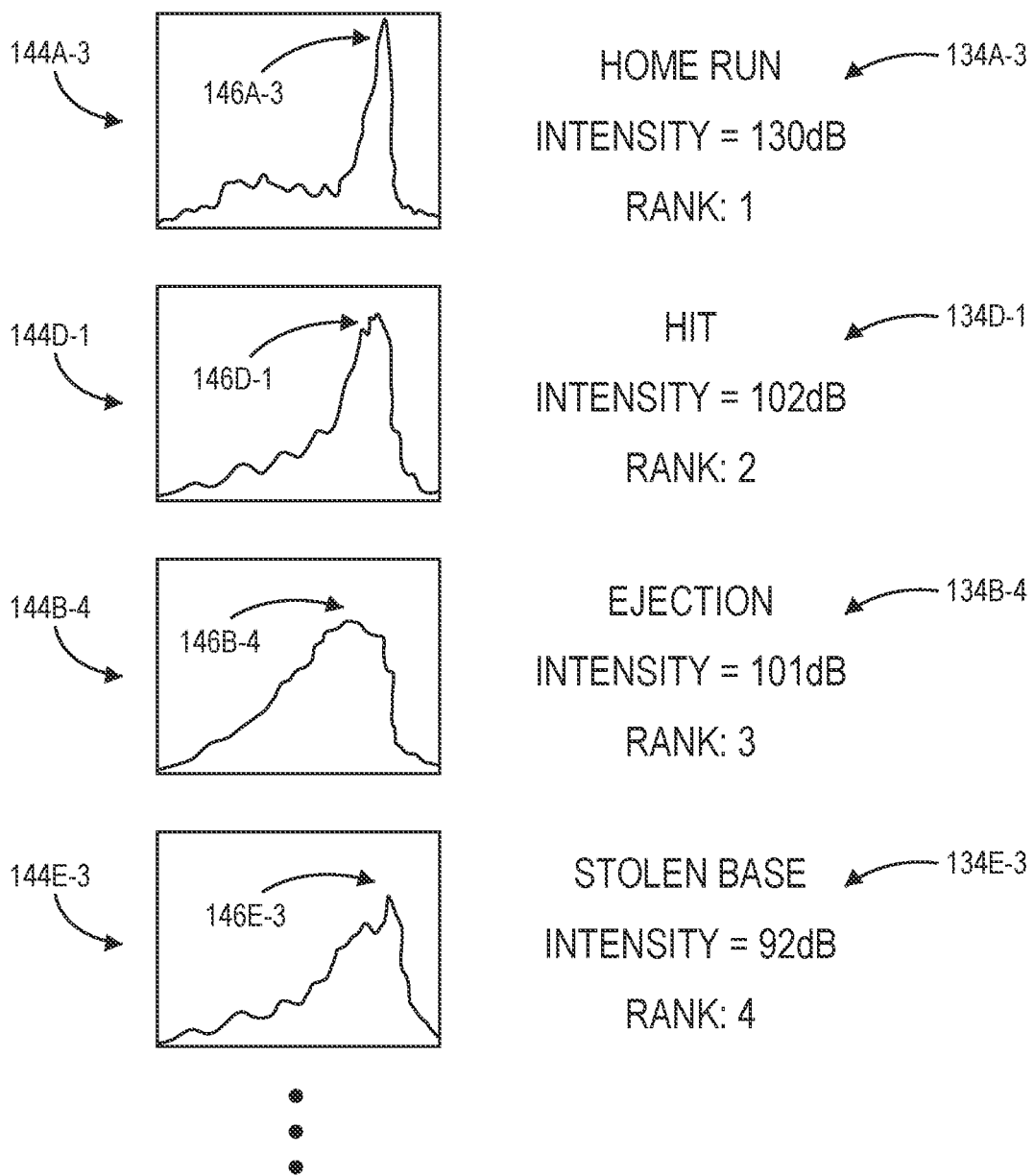

Additionally, as is shown in FIG. 1I, root mean squares 144A-3, 144D-1, 144B-4, 144E-3 of audio signals captured during various activities or events, including not only the audio signals captured by the camera 115-1 during the hit 134D-1 but also audio signals captured by the camera 115-3 during a home run 134A-3, audio signals captured by the camera 115-4 during an ejection 134B-4 and audio signals captured by the camera 115-3 during a stolen base 134E-3, are identified as having the four greatest maximum values 146A-3, 146D-1, 146B-4, 146E-3 of all activities or events of the live event. In particular, the home run 134A-3 has the greatest maximum value 146A-3, or 130 decibels, followed by the hit 134D-1, or 102 decibels, the ejection 134B-4, or 101 decibels, or the stolen base 134E-3, or 92 decibels.

Figure 1K:
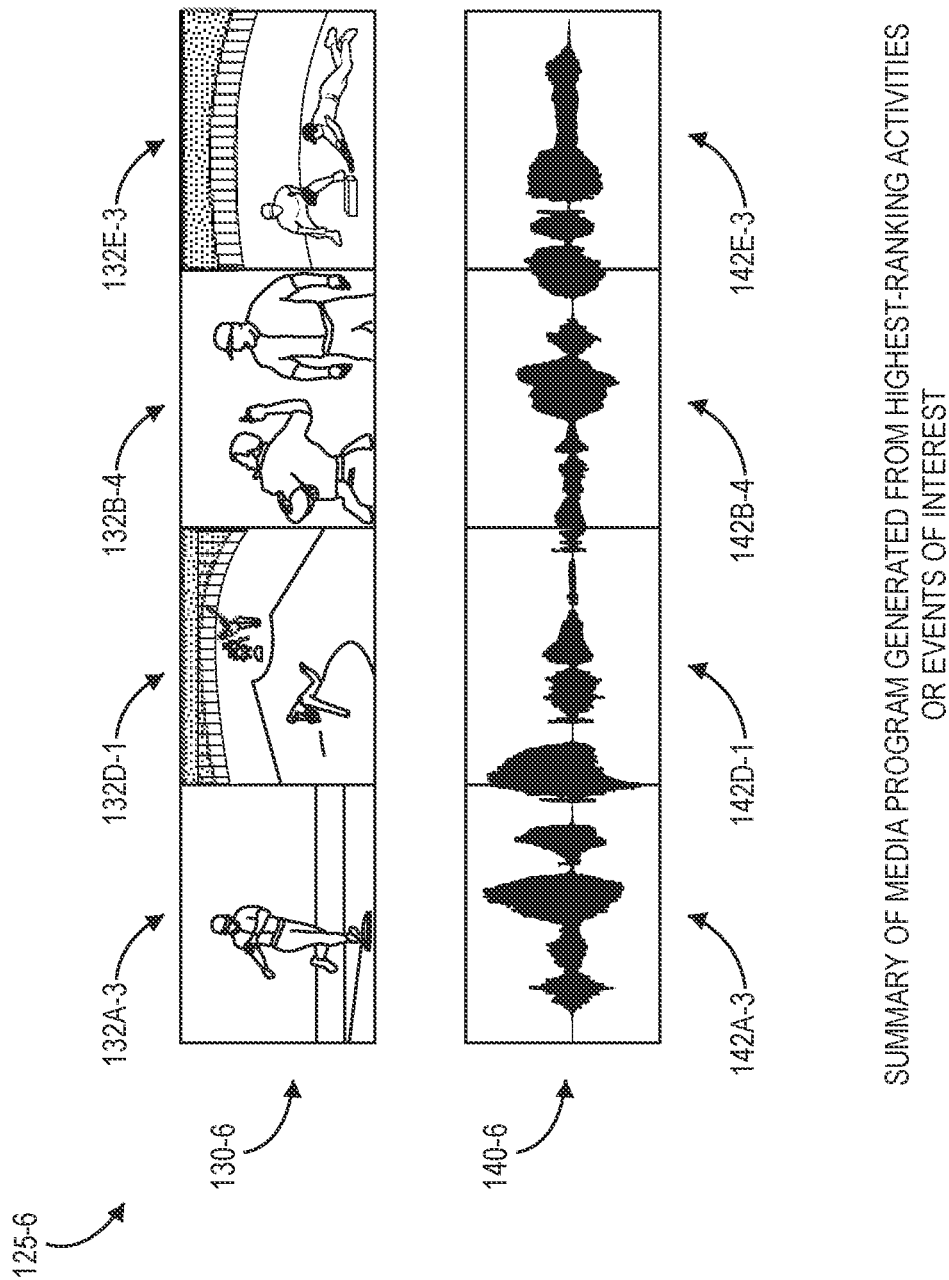

As is shown in FIG. 1J, video signals 132A-3, 132D-1, 132B-4, 132E-3 and audio signals 142A-3, 142D-1, 142B-4, 142E-3 captured during the home run 134A-3, the hit 134D-1, the ejection 134B-4 and the stolen base 134E-3 are identified. As is shown in FIG. 1K, a multimedia stream 125-6 that includes a set of video signals 130-6 and a set of audio signals 140-6 is generated as a summary of the live event. The set of video signals 130-6 includes the video signals 132A-3, 132D-1, 132B-4, 132E-3 captured during the home run 134A-3, the hit 134D-1, the ejection 134B-4 and the stolen base 134E-3, which may be combined in any manner, e.g., directly and seamlessly or, alternatively, with one or more transitions provided prior to, between or after any of such sets. For example, in some implementations, one or more video transitions that may be associated with any of the video signals may include fades in or out, dissolutions, zooms, cuts, wipes, or any other visual effects. Likewise, the set of audio signals 140-6 includes the audio signals 142A-3, 142D-1, 142B-4, 142E-3 captured during the home run 134A-3, the hit 134D-1, the ejection 134B-4 and the stolen base 134E-3, which may be combined in any manner, e.g., directly and seamlessly or, alternatively, with one or more transitions provided prior to, between or after any of such sets. Such transitions may include, but need not be limited to, any number of pans, delays, echoes, reverberations, distortions, compressions, or any other audio effects.

In generating the multimedia stream 125-6, the set of video signals 130-6 and the set of audio signals 140-6 of the multimedia stream 125-6 captured during the home run 134A-3, the hit 134D-1, the ejection 134B-4 and the stolen base 134E-3 may be arranged in any order. For example, in some implementations, such as is shown in FIG. 1K, the set of video signals 130-6 and the set of audio signals 140-6 may be concurrently arranged in an order selected based on the respective intensities of the audio signals 142A-3, 142D-1, 142B-4, 142E-3. In some other implementations, the set of video signals 130-6 and the set of audio signals 140-6 may be concurrently arranged in an order in which the home run 134A-3, the hit 134D-1, the ejection 134B-4 and the stolen base 134E-3 occurred during the live event, e.g., a time at which such activities or events occurred, or an inning in which such activities or events occurred. Alternatively, the set of video signals 130-6 and the set of audio signals 140-6 may be concurrently arranged in any order selected on any other basis.

Figure 1L:
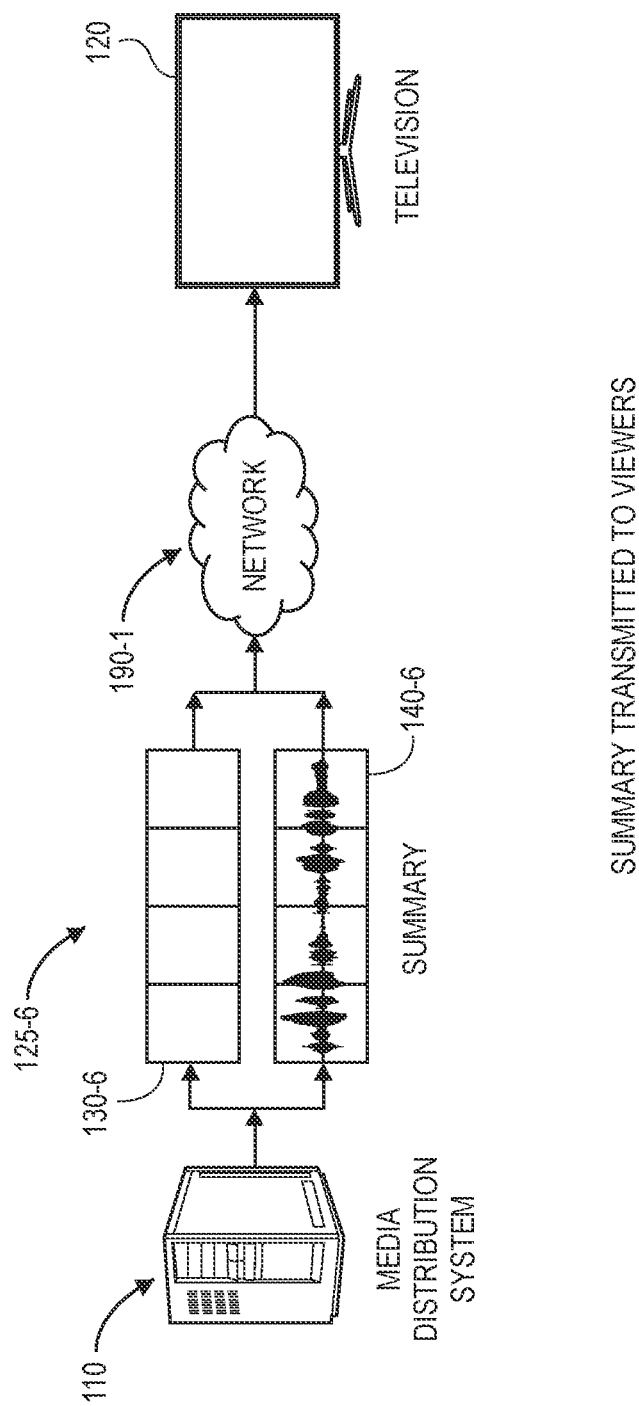

As is shown in FIG. 1L, the multimedia stream 125-6 is transmitted to one or more televisions 120 or other devices or systems of viewers over the network 190-1. The multimedia stream 125-6 may be transmitted independently or as a portion of another media program, e.g., a news media program, or in any other manner and at any other time. For example, in some implementations, the multimedia stream 125-6 may be generated and transmitted to the televisions 120 or other devices or systems of the viewers after the live event has concluded. In some other implementations, the multimedia stream 125-6 may be generated while the live event is in progress, and transmitted to the televisions 120 or other devices or systems of the viewers who may view the multimedia stream 125-6 and determine whether they are interested in viewing the live event. Alternatively, the multimedia stream 125-6 may be transmitted to any devices or systems of viewers over the networks 190-2, 190-3 of FIG. 1B, or otherwise provided to such viewers, in any other manner, and at any other time.

The receipt and processing of multimedia streams described above and in connection with FIGS. 1A through 1L may be performed by any computer device or system, including but not limited to the media distribution system 110, or any processor units provided in association with any of the cameras 115-1, 115-2, 115-3, 115-4, 115-5, or any other devices or systems. Moreover, although FIG. 1A shows only five cameras 115-1, 115-2, 115-3, 115-4, 115-5 provided in association with the venue 170, multimedia streams received from any number of cameras may be processed in accordance with implementations of the present disclosure. Furthermore, where an activity or an event of a live event is determined to be particularly important, interesting, notorious, significant or valuable based on audio signals captured by one camera or other recording device, video signals depicting the activity or the event that were captured concurrently or simultaneously by any number of other cameras or other recording devices may be included in a multimedia stream representing a summary (or a synopsis) of the live event.

One or more of the functions, applications or processes described above as being performed by the media distribution system 110 or elsewhere herein as being performed by a single computer device or system may be performed by two or more computer devices or systems. For example, in some implementations, one computer system may parse, tokenize and vectorize scripts or subtitles, and determine whether portions of the scripts correspond in time to portions of the subtitles, while another computer system may distribute media programs including visual images and audio signals to devices of viewers, such as the television 120.

Figure 2:
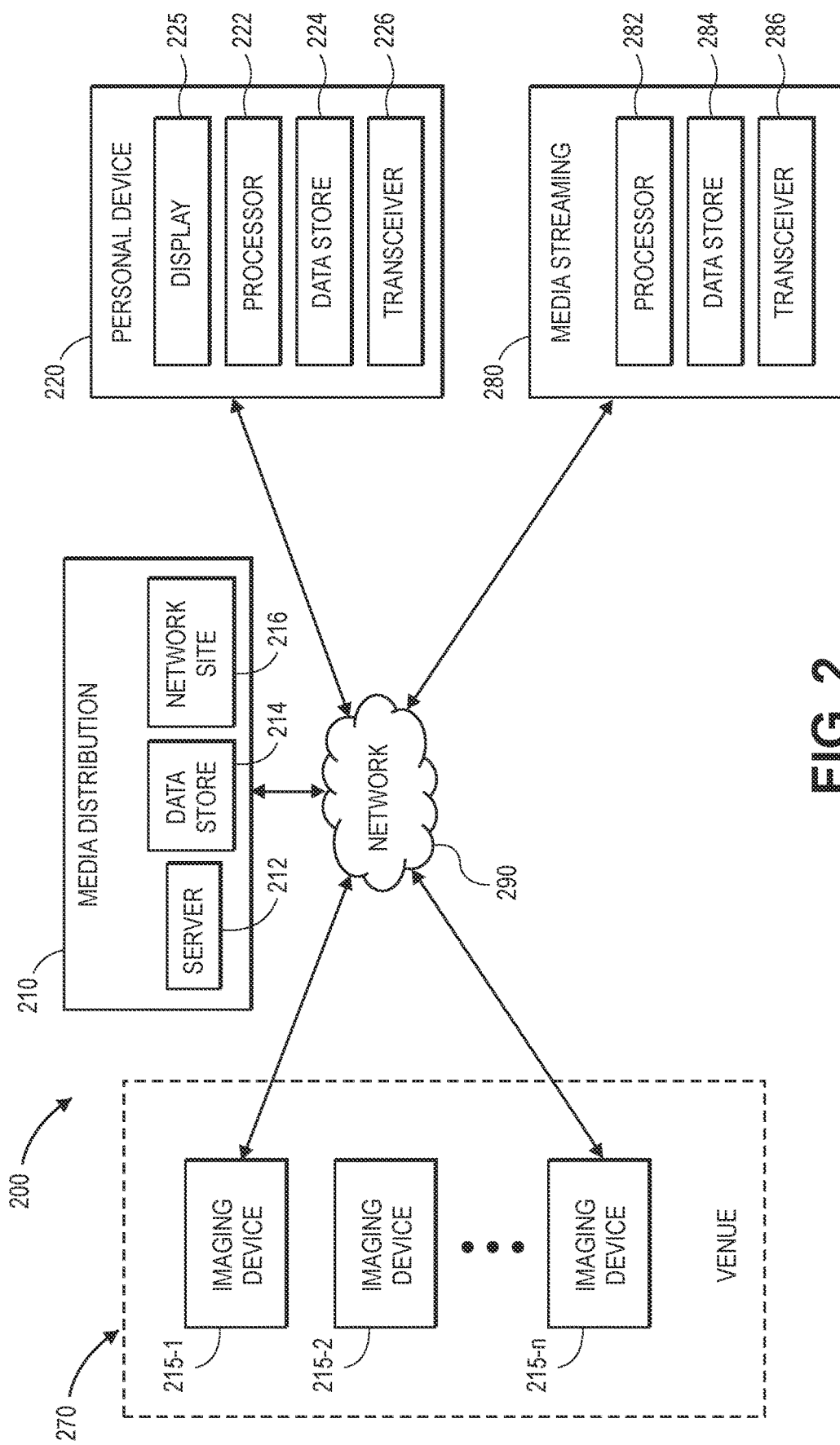
FIG. 2 is a block diagram of components of one system for generating summaries of events in accordance with implementations of the present disclosure.

Referring to FIG. 2, a block diagram of components of one system 200 for determining visual content of media programs in accordance with implementations of the present disclosure is shown. Except where otherwise noted, reference numerals preceded by the number "2" shown in FIG. 2 indicate components or features that are similar to components or features having reference numerals preceded by the number "1" shown in FIGS. 1A through 1L.

As is shown in FIG. 2, the system 200 includes a media distribution system 210, one or more imaging devices 215-1, 215-2 . . . 215-$n$ (e.g., cameras), one or more personal devices 220 and one or more media streaming devices 280 that may be connected to one another over one or more networks 290.

The media distribution system 210 may be any device, component or system for receiving and distributing digital media, e.g., still or moving images or other video content, audio content or other multimedia, by way of a networked computer infrastructure including one or more physical computer servers 212 and data stores 214 (e.g., databases) for hosting a network site 216 (or network sites). For example, the media distribution system 210 may be any individual or entity associated with the broadcasting, airing, streaming or distribution of one or more video files received from any number of imaging devices 215-1, 215-2 . . . 215-$n$ or third-party sources of information or data over the networks 290, such as an online marketplace, an entertainment company, a video streaming service, a cable television provider, an operator of an over-the-air television station or channel, a social network, an outlet for news or media of any kind, or any like individual or entity.

The media distribution system 210 may also be provided in connection with one or more physical or virtual services configured to manage or monitor digital media, as well as one or more other functions. The servers 212 may be connected to or otherwise communicate with the data stores 214 and may include one or more processors. The data stores 214 may store any type of information or data, including digital media files or any like files containing multimedia (e.g., audio and/or video content), for any purpose. The servers 212 and/or the data stores 214 may also connect to or otherwise communicate with the networks 290, through the sending and receiving of digital data.

In some implementations, the media distribution system 210 may be an Internet-based streaming content and/or media service provider. For example, the media distribution system 210 may be configured to distribute media (e.g., audio and/or video content) over the network 290 to one or more general purpose computers or computers that are dedicated to a specific purpose. The media distribution system 210 may also be configured to transmit content via a direct broadcast system, or to one or more specifically configured components such as televisions, set-top boxes or like units or components (e.g., cable boxes or converters).

For example, in some implementations, the media distribution system 210 may be associated with a television channel, network or provider of content of any type or form that is configured to transmit video files over the airwaves, via wired cable television systems, by satellite, over the Internet, or in any other manner. In some implementations, the media distribution system 210 may also be associated with any streaming video source that streams one or more video files for free or for a one-time or recurring fees. In some implementations, the media distribution system 210 may be associated with any type or form of network site (e.g., a web site), including but not limited to news sites, sports sites, cultural sites, social networks or other sites, that streams one or more video files over a network. In essence, the media distribution system 210 may be any individual or entity that makes content (e.g., audio and/or video files) of any type or form available to any other individuals or entities over one or more networks 290.

The media distribution system 210 of FIG. 2 may be independently provided for the exclusive purpose of managing the monitoring and distribution of video files or other information or data captured by the imaging devices 215-1, 215-2 . . . 215-n or received from any third-party sources, such as visual imaging data and/or accompanying audio signals and metadata. Alternatively, the media distribution system 210 may be operated in connection with one or more physical or virtual services configured to manage the monitoring or distribution of such files, as well as one or more other functions. The servers 212 may be connected to or otherwise communicate with the data stores 214 and may include one or more processors, circuits or other like systems or components. The data stores 214 may store any type of information or data, including digital media files or any like files containing multimedia (e.g., audio and/or video content), for any purpose. The network sites 216 may be provided for any purpose in association with the media distribution system 210, including but not limited to the marketing of one or more video files, receiving and granting authentication requests (e.g., log-in names and/or passwords), or any other purpose. The servers 212 and/or the computer processors may also connect to or otherwise communicate with the networks 290, through the sending and receiving of digital data.

The imaging devices 215-1, 215-2 . . . 215-n may comprise any form of optical recording sensor or device (or image sensor or device) provided within a venue 270 that may be used to photograph or otherwise record information or data regarding activities occurring within one or more areas or regions of the venue 270, e.g., an amphitheater, an arena, an auditorium, a ballpark, a convention center, a resort, a restaurant, a stadium, a theater, or any other facility, or for any other purpose. In some implementations, the venue 270 may be constructed or configured to host one or more sporting events, and may include one or more courts, fields, rinks or tracks within fields of view of one or more of the imaging devices 215-1, 215-2 . . . 215-n.

The media distribution system 210 may be associated with any number of the imaging devices 215-1, 215-2 . . . 215-n, each of which may include any number of sensors, memory or storage components (e.g., a database or another data store), processors and any other components that may be required in order to capture, analyze and/or store imaging data or accompanying audio signals captured from within static or variable environments in which one of the imaging devices 215-1, 215-2 . . . 215-n is provided. For example, one or more imaging devices 215-1, 215-2 . . . 215-n may capture visual signals representing one or more still or moving images, along with any relevant audio signals or other information, and may also connect to or otherwise communicate with one another, or with the networks 290.

Alternatively, multimedia streams may be received from any third-party sources of media, such as a linear channel, a television station or network, a cable television provider, a streaming service, or others. Multimedia streams that are received from such sources may have been captured live by one or more cameras or other imaging devices, or otherwise obtained in any other manner, such as by purchasing or renting rights to air the media, e.g., by way of the media distribution system 210 or in any other manner, such as files over the airwaves, via wired cable television systems, by satellite, or in any other manner.

In addition to the imaging devices 215-1, 215-2 . . . 215-n, the media distribution system 210 may include any type or form of systems or components for receiving video files and associated audio signals or metadata, e.g., over the networks 290. For example, the media distribution system 210 may receive one or more video files via any wired or wireless means and store such video files in the one or more data stores 214 for subsequent processing, analysis and distribution. In some implementations, the media distribution system 210 may process and/or analyze video files captured by the imaging devices 215-1, 215-2 . . . 215-n, or received over the networks 290 from a third-party source, according to one or more detection or recognition algorithms or techniques, in order to detect or recognize one or more attributes of the visual content expressed therein, or of the audio signals accompanying such visual content. In some implementations, the media distribution system 210 may be further configured to add or assign metadata, e.g., one or more tags or virtual markings, to video files. Such metadata may indicate times or points within a video file where one or more specific activities or events, or categories of activities or events, are depicted or referenced therein, or include one or more identifiers of such activities or events. The media distribution system 210 may generate any type or form of record associated with the visual content of a video file, or the audio signals accompanying the video file, and may store such records in association with a corresponding video file or separately, e.g., in a structured form. Such records may be made available to other entities, such as the personal device 220 and/or the media streaming device 280 e.g., over the networks 290.

Additionally, the media distribution system 210 may be further configured to edit, crop, alter, modify or adjust one or more attributes of a video file. For example, where a video file is captured by any of the imaging devices 215-1, 215-2 . . . 215-*n*, or received from a third-party source over the networks 290, one or more single images, or streams of images, may be captured or otherwise obtained from the video file, and transmitted to the personal device 220 and/or the media streaming device 280. The media distribution system 210 may also be configured to compare and contrast visual content and/or audio signals or metadata regarding two or more multimedia files, and to make any number of determinations regarding the similarity or differences between such video files, audio signals or metadata. For example, the media distribution system 210 may be configured to identify attributes of one or more video frames of a video file, such as information or data regarding edges, contours, outlines, colors, textures, silhouettes, shapes or other characteristics of objects or portions thereof expressed in such video frames, e.g., according to one or more detection or recognition algorithms or techniques, and to compare such attributes to attributes of other video frames of other video files. The media distribution system 210 may also be configured to calculate one or more scores indicative of similarities or differences between such frames or such files. The media distribution system 210 may also be configured to engage in communications of any type or form with the personal device 220 and/or the media streaming device 280.

The media distribution system 210 may further broadcast, air, stream or otherwise distribute video files maintained in the data stores 214 to one or more users, via the personal devices 220 and/or the media streaming devices 280, over the networks 290. Accordingly, in addition to the server 212, the data stores 214, and the network sites 216, the media distribution system 210 may also include any number of components associated with the broadcasting, airing, streaming or distribution of such files, including but not limited to transmitters, receivers, antennas, cabling, satellites, or communications systems of any type or form. Processes for broadcasting, airing, streaming and distribution of video files over various networks are well known to those skilled in the art of communications and thus, need not be described in more detail herein.

For example, in some implementations, the media distribution system 210 may also receive or access one or more records of information, data or metadata regarding preferences of a given user, or of users similarly situated to the user or otherwise having one or more attributes in common with the user, as well as any information, data or metadata regarding one or more contexts or events, instances or occurrences of particular relevance in association with a specific time or location. Based on such information, data or metadata, the media distribution system 210 may identify media content (e.g., audio and/or video content) to be presented to a user in association with one or more applications or content sources, including but not limited to media content to be promoted to the user, or contextual or supplemental content to be displayed to the user in association with the applications or content sources. The media distribution system 210 may further generate media files including such content, or modify one or more existing media files to include such content, and transfer such video files to the personal device 220 or the media streaming device 280 over the networks 290 or by any other means.

Additionally, the media distribution system 210 may further engage in communications of any type or form with the personal devices 220 and/or the media streaming devices 280.

The personal device 220 may be any peripheral output device capable of receiving and displaying or otherwise outputting any content. The personal device 220 may be associated with any user (e.g., an individual or entity), and may be a general purpose or a special purpose device for viewing content and/or communicating with other computer devices over the networks 290. For example, the personal device 220 may be a television of any type or form, as well as any type of networked computer device (e.g., a personal digital assistant, a digital media player, a smartphone, a web pad, an electronic book reader, a desktop computer, a laptop computer or a tablet computer, as well as a wearable computer device such as a pair of augmented reality glasses or a wristwatch, or a computer device that may be incorporated into one or more vehicles or appliances) or any other like machine that may operate or access one or more software applications, or communicate with the media streaming device 280, and may be configured to render content on one or more displays or to interact with such content.

The personal device 220 may include a display (or screen) 225, a processor 222, a data store 224 and/or a transceiver 226. The display 225 may be a television system, a monitor or any other like machine having a screen for viewing rendered video content. For example, the display 225 may incorporate any number of active or passive display technologies or systems, including but not limited to electronic ink, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to micro-electromechanical systems (or "MEMS"), spatial light modulators, electroluminescent displays, quantum dot displays, liquid crystal on silicon (or "LCOS") displays, cholesteric displays, interferometric displays or others. The display 225 may be configured to receive content from any number of sources via one or more wired or wireless connections, including but not limited to the media distribution system 210 or the media streaming devices 280 over the networks 290.

The processor 222 may be configured to perform any type or form of computing function associated with the operation of the personal device 220, including but not limited to the execution of one or more machine learning tools, algorithms or techniques. The processor 222 may also be configured to execute any other algorithms or techniques (e.g., object detection or recognition algorithms or techniques) associated with one or more applications, purposes or functions, and may communicate with the media distribution system 210, the media streaming system 280, or any other external computing devices or machines over the network, through the sending and receiving of digital data.

The processor 222 may be a uniprocessor system including one processor, or a multiprocessor system including several processors (e.g., two, four, eight, or another suitable number), and may be capable of executing instructions. For example, in some implementations, the processor 222 may be a general-purpose or embedded processor unit such as a CPU or a GPU having any number of instruction set architectures (ISAs), such as the x86, PowerPC, SPARC, or MIPS ISAs, or any other suitable ISA. Where the processor 222 is a multiprocessor system, each of the processors within the multiprocessor system may operate the same ISA, or different ISAs. The processors 222 may be configured to operate one or more software applications, e.g., a browser, a viewing application operating one or more codecs, a shopping application, and render content to the display 225 via one or more user interfaces. The processor 222 may execute one or more computer-based instructions that may be stored in the data store 224, along with one or more video files or operating programs or instructions.

The personal device 220 further includes one or more data stores (e.g., memory or storage components) 224 for storing any type of information or data, e.g., content received over the network 290, or any associated information, data or metadata. The personal device 220 also includes the transceiver 226, which may be configured to enable the personal device 220 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly.

The transceivers 226 may be configured to communicate over one or more of the networks 290, such as by receiving and interpreting broadcast signals, cable television signals, computer signals, cellular telephone signals or any other type or form of signals, and responding in kind with any number of corresponding or reciprocal signals. The transceiver 226 may further include or be in communication with one or more input/output (or "I/O") interfaces, network interfaces and/or input/output devices, and may be configured to allow information or data to be exchanged between one or more of the components of the personal device 220, or to one or more other computer devices or systems (e.g., other aerial vehicles, not shown) via the network 290. For example, in some implementations, the transceiver 226 may be configured to coordinate I/O traffic between the processor 222 and one or more external computer devices or components, and may perform any necessary protocol, timing or other data transformations in order to convert data signals from a first format suitable for use by one component into a second format suitable for use by another component. In some implementations, the transceiver 226 may include support for devices attached through various types of peripheral buses, e.g., variants of the Peripheral Component Interconnect (PCI) bus standard or the Universal Serial Bus (USB) standard. In some other implementations, functions of the transceiver 226 may be split into two or more separate components, or integrated with the processor 222.

The media streaming device 280 may also be any type of device or devices capable of outputting visual and/or audible content, e.g., from the media distribution system 210 or any other sources of such content, and providing such content to the personal device 220 according to any protocols and by any wired or wireless techniques, e.g., a high-definition multimedia interface (HDMI) protocol, such as a Consumer Electronics Control (CEC) protocol. The media streaming device 280 includes a processor 282, a data store 284 and a transceiver 286, which may share one or more attributes, features or functions in common with the processor 222, the data store 224 or the transceiver 226, respectively, or may have one or more attributes, features or functions that are different from those of the processor 222, the data store 224 or the transceiver 226 of the personal device 220. In some implementations, the media streaming device 280 may also be capable of communicating with and controlling the personal device 220, e.g., to turn the personal device 220 on or off, to select an input source for the personal device 220, to adjust a volume of the personal device 220, or to otherwise control any other functions of the personal device 220.

Those of ordinary skill in the pertinent arts will recognize that the personal device 220 or the media streaming device 280 may include any number of hardware components or operate any number of software applications for receiving and rendering content received from the media distribution system 210 or other sources.

Moreover, those of ordinary skill in the pertinent arts will further recognize that, alternatively, in some implementations, the personal device 220 or the media streaming device 280 need not be associated with a given user. For example, the personal device 220 or the media streaming device 280 may be provided in a public place, beyond the control of any one user, e.g., a television provided in a bar, restaurant, transit station, or shopping center, or an electronic billboard provided in a population center or along a transit line, where any individuals may view and/or interact with video content rendered on the display 225.

Although the system 200 shown in FIG. 2 shows boxes for one media distribution system 210, three imaging devices 215-1, 215-2 . . . 215-n, one personal device 220, one media streaming device 280 and one network 290, those of ordinary skill in the pertinent arts will recognize that any number of media distribution systems 210, imaging devices 215-1, 215-2 . . . 215-n, personal devices 220, media streaming devices 280 or networks 290 may be considered in accordance with the present disclosure. For example, multiple users may access, view and interact with content provided by multiple media distribution systems 210 (e.g., television channels or networks, marketplaces, social networks and any other content providers or sites), via multiple personal devices 220 or media streaming devices 280, and such content may include multiple types or forms of media provided by multiple content sources. Moreover, the personal devices 220 or the media streaming devices 280 with which users interact to access, view and interact with content may include all or fewer of the components shown in FIG. 2 or perform all or fewer of the functions described herein. For example, a user may view content on one personal device 220 or via one media streaming device 280, and execute interactions relating to that content on another personal device 220 or another media streaming device 280, using a remote control, a smartphone, a smart speaker, a smart wristwatch, or the like.

The network 290 may be any wired network, wireless network, or combination thereof, and may comprise the Internet, intranets, broadcast networks, cellular television networks, cellular telephone networks, satellite networks, or any other networks, in whole or in part. In addition, the network 290 may be a personal area network, local area network, wide area network, cable network, satellite network, cellular telephone network, or combination thereof, in whole or in part. The network 290 may also be a publicly accessible network of linked networks, possibly operated by various distinct parties, such as the Internet. In some implementations, video files may be provided by the media distribution system 210 to the personal device 220 or the media streaming device 280 over multiple networks 290. For example, a video file may be broadcast over the air or via satellite to a cable television provider, before being transmitted by the satellite or the provider to a receiver associated with the personal device 220, and shown on the display 225 and/or recorded in the data store 224. Alternatively, video files may be transmitted over a traditional computer network, such as the Internet, prior to reaching the personal device 220. In some implementations, the network 290 may include a private or semi-private network, such as a corporate or university intranet. The network 290 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The server 212 and the personal device 220, and associated components, may use any web-enabled or Internet applications or features, or any other client-server applications or features, to connect to the networks 290, or to communicate with one another, such as through short or multimedia messaging service (SMS or MMS) text messages. For example, the server 212, the personal device 220 and the media streaming device 280 may be configured to transmit information or data in the form of synchronous or asynchronous messages to one another in real time or in near-real time, or in one or more offline processes, via the networks 290. Those of ordinary skill in the pertinent art would recognize that the imaging devices 215-1, 215-2 . . . 215-n, the server 212, the personal device 220 and the media streaming device 280 may include or operate any of a number of computing devices that are capable of communicating over the networks 290. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components such as the imaging devices 215-1, 215-2 . . . 215-n, the server 212, the processor 222, or the processor 282, or to any other computers or control systems utilized by the media distribution system 210, the personal device 220, or the media streaming device 280, and having sequences of instructions which, when executed by a processor (e.g., a central processing unit, or "CPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks, e.g., the network 290.

As used herein, the terms "image," "video," "video program," or like terms, may refer to files comprising one or more images or video frames that are configured for broadcasting, airing, streaming or distributing in any manner, such as over any number of networks, or in a hard storage format (e.g., a DVD, a stick drive or another physically portable format). As used herein, the terms "sounds," "audio," "audio program," or like terms, may refer to files comprising one or more sounds or other acoustic signals that are also configured for broadcasting, airing, streaming or distributing in any manner, such as over any number of networks, or in a hard storage format. As used herein, the terms "program," "content," "media" or "multimedia" may refer to audio and/or video files that may be presented by one or more of a personal device directly, or by a personal device via a media streaming device, and may include but are not limited to information, data or metadata including or relating to such audio and/or video files.

Figure 3:
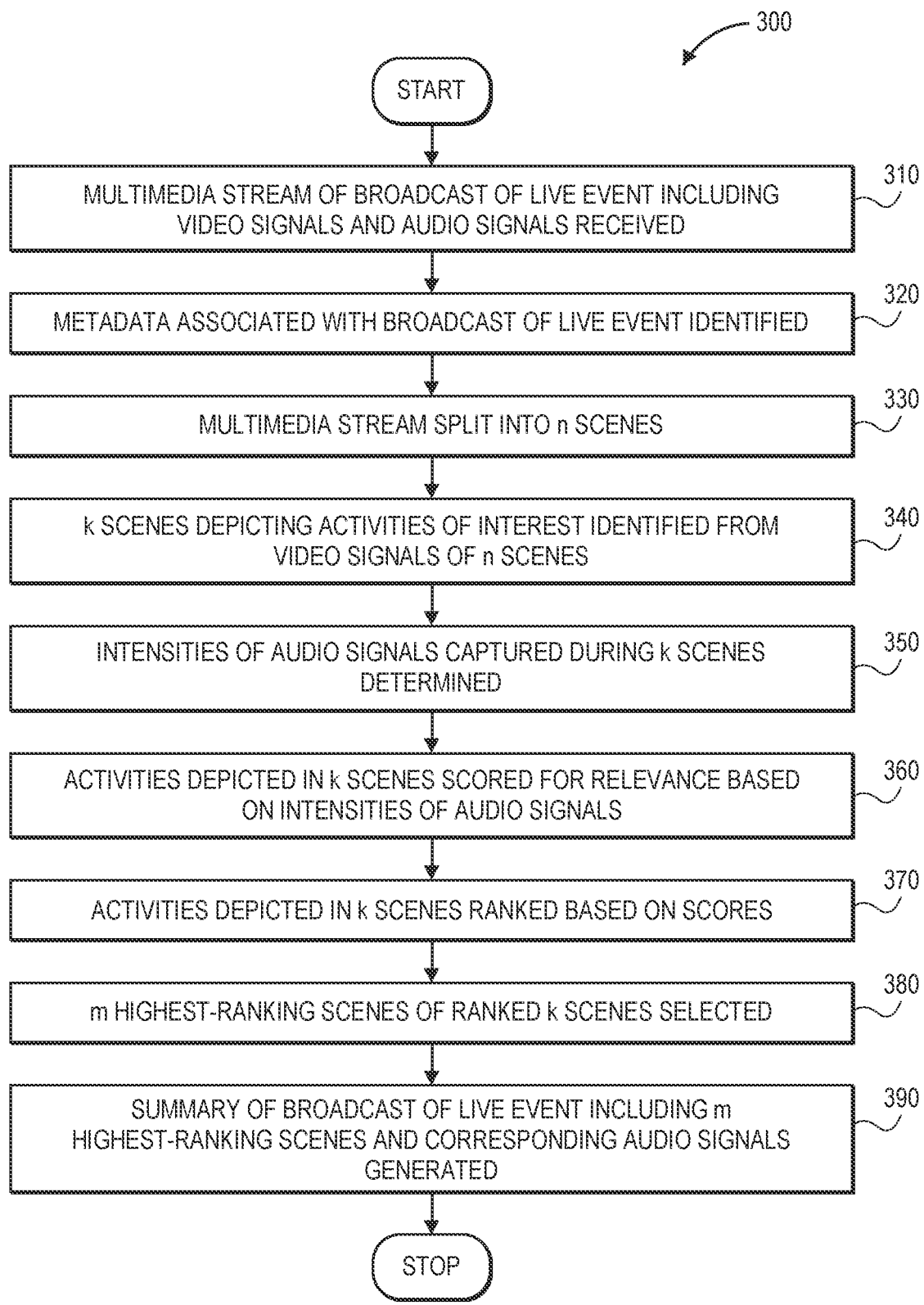
FIG. 3 is a flow chart of one process for generating summaries of events in accordance with implementations of the present disclosure.

Referring to FIG. 3, a flow chart 300 of one process for generating summaries of events in accordance with implementations of the present disclosure is shown.

At box 310, a multimedia stream of a broadcast of a live event including video signals and audio signals is received. The live event may be any organized activity during which video signals and audio signals are captured and broadcast live to one or more viewers or listeners in the same location, or in other locations.

In some implementations, the live event may be a sporting event, such as a baseball game, a basketball game, a football game, a golf match or tournament, a hockey game, a soccer game, a tennis match, or any other sporting event.

Alternatively, the live event may be a news broadcast, a parade, a performance such as a play or a concert, a public meeting, a social gathering, or any other event during which video signals and audio signals may be captured and broadcast to viewers or listeners.

The video signals and the audio signals may be captured by any type or form of camera or recording device or system. In some implementations, the video signals or the audio signals may be captured using one or more cameras, which may be carried or worn by one or more humans, or mounted or placed using one or more fixed or movable systems. In some implementations, the cameras may be suspended by one or more cables, stanchions, rails or other systems, and may be operated using one or more electromechanical systems controlled by a human or autonomously. For example, in some implementations, the cameras may be mounted to one or more aerial vehicles, which may be operated by one or more humans or autonomously.

The video signals and the audio signals may have any level of quality or resolution. For example, the video signals may be streamed at any level of resolution, such as 1280× 720, 1920×1080, 3840×2160, or others, or at any bitrate, which may range from 1,200 kilobits per second to 14,000 kilobits per second, or others. The audio signals may be sampled at any rate, e.g., approximately forty-four to forty-eight kilohertz, and at any bit rate, such as 128 to 192 kilobits per second.

The multimedia may be streamed according to any formats or protocols, e.g., HTTP Live Streaming ("HLS"), Real-Time Messaging Protocol ("RTMP"), Secure Reliable Transport ("SRT"), Dynamic Adaptive Streaming over HTTP ("MPEG-DASH"), WebRTC, or others. In some implementations, multiple multimedia streams may be received, e.g., from two or more cameras provided in association with the live event.

At box 320, metadata associated with the broadcast of the live event is identified. The metadata may be synchronized with the multimedia stream, and may identify or reference any number of aspects or attributes of the broadcast or the live event. For example, the metadata may identify a start time and an end time of the live event, a location of the live event, as well as any participants in the live event (e.g., players, teams, or the like), or any producers of the broadcast of the live event.

The metadata may further identify or indicate times or durations of specific activities occurring during the live event, or may identify such specific activities. For example where the live event is a sporting event, the metadata may identify start times and end times of plays, as well as types of plays, names of teams or players involved in plays (e.g., in possession of a ball), statuses or changes in status of the sporting event (e.g., players joining or departing the sporting event), or measures or indicators of success or failure of plays (e.g., whether a pass was completed, whether a serve landed inbounds, whether a shot entered a goal, or others). The metadata may also include descriptions or classifications of the live event, or of specific activities or events occurring during the live event.

The metadata may have been generated by one or more humans, automatically, or by a combination of human-performed or automated procedures or techniques. In some implementations, the metadata may be derived from one or more multimedia streams received at box 310. For example, the metadata may be identified from audio signals included in the metadata, e.g., sounds representing voices of commentators or other individuals associated with the live event, or generated by such commentators or individuals.

Alternatively, in some implementations, metadata need not be required, and the process step represented in box 320 may be bypassed.

At box 330, the multimedia stream is split into n scenes. For example, in some implementations, the multimedia stream may be split or otherwise divided into the n scenes (or segments of the multimedia stream) as the broadcast of the live event is in progress, e.g., in real time or near-real time, or at any other time during the broadcast. In some implementations, the multimedia stream may be provided to a tool, an algorithm or an application executed in one or more programming languages, or by any other technique. Scenes may be identified based on changes in visual content between consecutive or proximate frames, or in any other manner.

In some implementations, a scene identified from the multimedia stream may be deemed to include a portion or segment of multimedia preceding that scene, or a portion or segment of multimedia following that scene, e.g., as buffers to that scene. Such portions or segments of multimedia preceding or following a scene may have any duration. For example, where the live event is a sporting event, and where a scene is identified as depicting a play of the sporting event, such as a baseball pitch, a football snap, or a golf shot, or any other play, the scene may be deemed to include portions or segments of the multimedia stream depicting activities preceding the play, e.g., a baseball windup, a football huddle, or a golf practice swing, or others, as well as portions or segments of the multimedia stream depicting activities following the play, e.g., a baseball hit, a football tackle, or a golf swing follow-through, or others.

In some implementations, scenes may be identified from the multimedia stream by one or more humans.

Alternatively, the multimedia stream may be split into the n scenes after the live event has concluded, or after the broadcast has been completed.

At box 340, k scenes depicting activities of interest are identified from video signals of the n scenes. For example, after the multimedia stream has been split or otherwise divided into the n scenes at box 330, each of the n scenes may be processed to determine whether such scenes depicts a predetermined activity of interest, such as a throwing of a ball, a swing of a bat, a club or a stick, or any other movement that may be detected or recognized within video signals of the multimedia stream. The k scenes may be a subset of the n frames into which the multimedia stream is split at box 330, such that k<n.

In some implementations, the k scenes depicting activities of interest may be identified based on the metadata identified at box 320, by a human, or in any other manner.

At box 350, intensities of audio signals captured during the k scenes are determined. In some implementations, the audio signals that were captured concurrently or simultaneously with video signals from which the k scenes were identified may be processed in any manner, e.g., according to one or more machine learning algorithms, systems or techniques, to determine a measure of power, intensity (e.g., sound pressure) or loudness of each of the audio signals over a period of time of any duration, such as one-half second, one second, five seconds, or any other durations.

In some implementations, audio root mean square (or "RMS") values may be determined for each of the audio signals captured during the k scenes.

In some implementations, intensities of audio signals may be determined for each of the n scenes that were concurrently or simultaneously captured with video signals of each of the n scenes. In some implementations, the intensities of the audio signals may be determined in parallel with the identification of the k scenes depicting activities of interest, or with the splitting of the multimedia stream into the n scenes. Alternatively, in some implementations, audio signals having sufficiently brief durations may be excluded from consideration when determining intensities or other acoustic characteristics of audio signals captured during the k scenes.

At box 360, activities depicted in the k scenes, as determined at box 340, are scored for relevance based on the intensities of the audio signals. For example, for each of the activities depicted in the k scenes, scores may indicate an extent to which intensities of the audio signals captured during one of the k activities deviates from intensities of the audio signals captured during all of the activities depicted in the k scenes. Because audio signals captured during an activity include or represent sounds generated by spectators (e.g., fans), attendees (e.g., members of bands or other musical groups in attendance at the live event), or participants (e.g., players or other actors) during the activity, intensities of audio signals captured during an activity may indicate a level of importance, interest, notoriety, significance or value of the activity, as compared to other activities. Such sounds may include but need not be limited to sounds of cheering, booing, shouting, or other speech or conversation of spectators, attendees or participants, as well as clapping, music, or any other sounds associated with the live event or the broadcast.

In some implementations, a score may be calculated for each of the activities depicted in the k scenes based on the intensities determined at box 350, such as by comparing the intensities to average intensities of sounds, threshold limits, or any other values or limits. For example, in some implementations, where an intensity of sound recorded during one activity is a greatest intensity of sounds captured during the n scenes, or during the k activities, a score calculated for that activity may have a greatest value of all of the k activities. Alternatively, where an intensity of sound recorded during one activity is a lowest intensity of sounds captured during the n scenes, or during the k activities, a score calculated for that activity may have a lowest value of all of the scores calculated for all of the k activities.

In some implementations, a score may be calculated for one of the activities depicted in the k scenes by comparing intensities of audio signals captured during the one of the k activities to intensities of audio signals captured during all of the k activities. Alternatively, in some implementations, a score may be calculated by comparing intensities of audio signals that are captured proximate in time to one another during the live event. For example, where the live event is a sporting event having quarters or periods, audio signals captured during the k activities that occurred in a given quarter or period may be compared to one another.

At box 370, the activities depicted in the k scenes are ranked based on the scores determined at box 360. For example, where the scores determined at box 360 indicate levels of importance, interest, notoriety, significance or value of the k activities, as determined based on the intensities of the audio signals, ranking the k activities based on such scores effectively ranks such events based on their respective levels of importance, interest, notoriety, significance or value. The activities depicted in the k scenes may be ranked on any basis. For example, activities occurring at outsets or conclusions of live events may be ranked more highly than activities occurring at other times during the live events.

At box 380, m highest-ranking scenes of the ranked scenes are selected. The number m may represent a predetermined or selected number of the most important, interesting, notorious, significant or valuable activities, as determined based on the scores. Alternatively, or additionally, one or more of the m scenes may be selected based on a portion of the live event that such scenes depict or represent. For example, where the live event is a sporting event, and a scene depicts a notable event such as a pre-game announcement or anthem, a first pitch, a first kick, or another initial or opening play, a halftime show, or a post-game announcement or presentation, a last pitch, a last kick, or another final or concluding play, such scenes may be included within the m highest-ranking scenes regardless of the scores calculated for such scenes or others.

The number m of the ranked scenes may be selected on any basis. For example, in some implementations, the number m may be selected to include all scenes having scores above a predetermined threshold. In some implementations, the number m may be selected based on the metadata, or based on values of the respective scores.

Alternatively, the number m may be selected based on a total duration of ranked scenes. For example, where a summary of the broadcast of the live event is intended to have a fixed duration, e.g., one minute, two minutes, five minutes, or any other duration, the m scenes may be a number of the highest-ranking scenes which, in total, have a cumulative duration that is not greater than the intended duration of the summary.

At box 390, a summary of the broadcast of the live event including the m highest-ranking scenes is generated, and the process ends. As is discussed above, the summary may be a multimedia stream including video signals depicting the m highest-ranking scenes and audio signals concurrently or simultaneously captured with such video signals. The summary may include the m highest-ranking scenes in any order. For example, in some implementations, the summary may include video signals and audio signals of the m highest-ranking scenes ranked in order of the intensity or root mean squares of the audio signals. Alternatively, in some implementations, the summary may include the video signals and audio signals of the m highest-ranking scenes in an order selected based on times at which activities depicted in the scenes occurred, e.g., in a sequential order.

The summary may be stored in one or more data stores and transmitted to devices or systems of listeners over one or more networks, e.g., computer networks that may include the Internet in whole or in part, broadcast television networks, cable television networks, cellular telephone networks, or any other types or forms of networks.

In some implementations, activities or events of interest may be identified or scored based on multimedia streams captured by multiple cameras or other recording devices or systems, and a summary of the broadcast of the live event may include any audio signals or any video signals included in any of such streams. For example, where the multimedia streams are synchronized, an activity or an event of interest may be identified based on intensities, power levels or other acoustic characteristics of audio signals included in one multimedia stream, and a summary of the broadcast of the live event may include audio signals and/or video signals included in any other multimedia streams other than the multimedia stream from which the activity or event of interest was identified.

Furthermore, in some implementations, metadata from which an activity or an event of interest is identified may be derived from a multimedia stream itself. For example, where one or more of audio signals of a multimedia stream includes voices of commentators or other individuals associated with the broadcast of the live event, as well as sounds generated by spectators (e.g., fans), attendees (e.g., members of bands or other musical groups in attendance at the live event), participants (e.g., players or other actors), or others, the voices of the commentators or other individuals may be stripped or separated from the sounds generated by the spectators, attendees, participants or others. Sounds representing the voices of the commentators or other individuals may then be transcribed or otherwise processed to determine information or data regarding the respective activities or events occurring during the live event, and some or all of the metadata may be generated from such sounds. Meanwhile, sounds generated by the spectators, attendees, participants or others during the live event may be processed to identify activities or events of interest, e.g., based on intensities, power levels or other acoustic characteristics of such sounds.

Referring to FIGS. 4A through 4D, views of aspects of one system for generating summaries of events in accordance with implementations of the present disclosure are shown. Except where otherwise noted, reference numerals preceded by the number "4" shown in FIGS. 4A through 4D indicate components or features that are similar to components or features having reference numerals preceded by the number "2" shown in FIG. 2 or by the number "1" shown in FIGS. 1A through 1L.

Figure 4A:
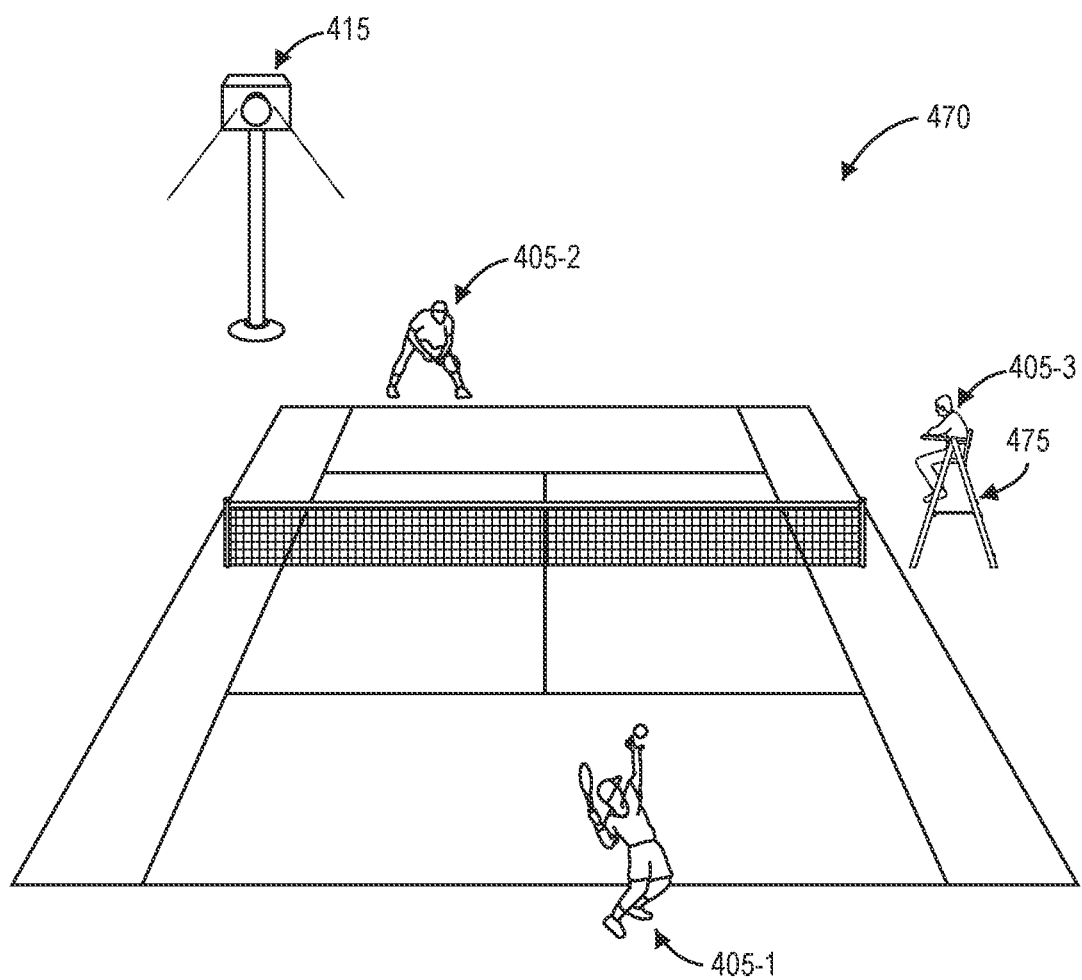
FIGS. 4A through 4D are views of aspects of one system for generating summaries of events in accordance with implementations of the present disclosure.

As is shown in FIG. 4A, a camera 415 is aligned to capture streams of multimedia at a venue 470, which may be a stadium, an arena, or any other like facility. For example, as is shown in FIG. 4A, the camera 415 is mounted in an area of the venue 470 and aligned to capture streams of multimedia, e.g., video signals and audio signals, regarding activities or events occurring within a field of view that generally includes a tennis court. The venue 470 may further include any number of other recording devices or systems (e.g., imaging devices or acoustic sensors) provided in any number of other locations at or near the venue 470, e.g., above, adjacent to or alongside the tennis court, and may be configured to capture multimedia streams regarding activities or events occurring within or in association with the venue 470.

As is further shown in FIG. 4A, the camera 415 captures streams of multimedia, e.g., video signals and audio signals, as a pair of tennis players 405-1, 405-2 are engaged in a tennis match at the venue 470. Additionally, an official 405-3 is seated on a structure 475 in the venue 470, within the field of view of the camera 415. Alternatively, the venue 470 may include any number of cameras (not shown) other than the camera 415. Such cameras may include any portions of the venue 470 within their respective fields of view, and may capture streams of multimedia from such fields of view.

Figure 4B:
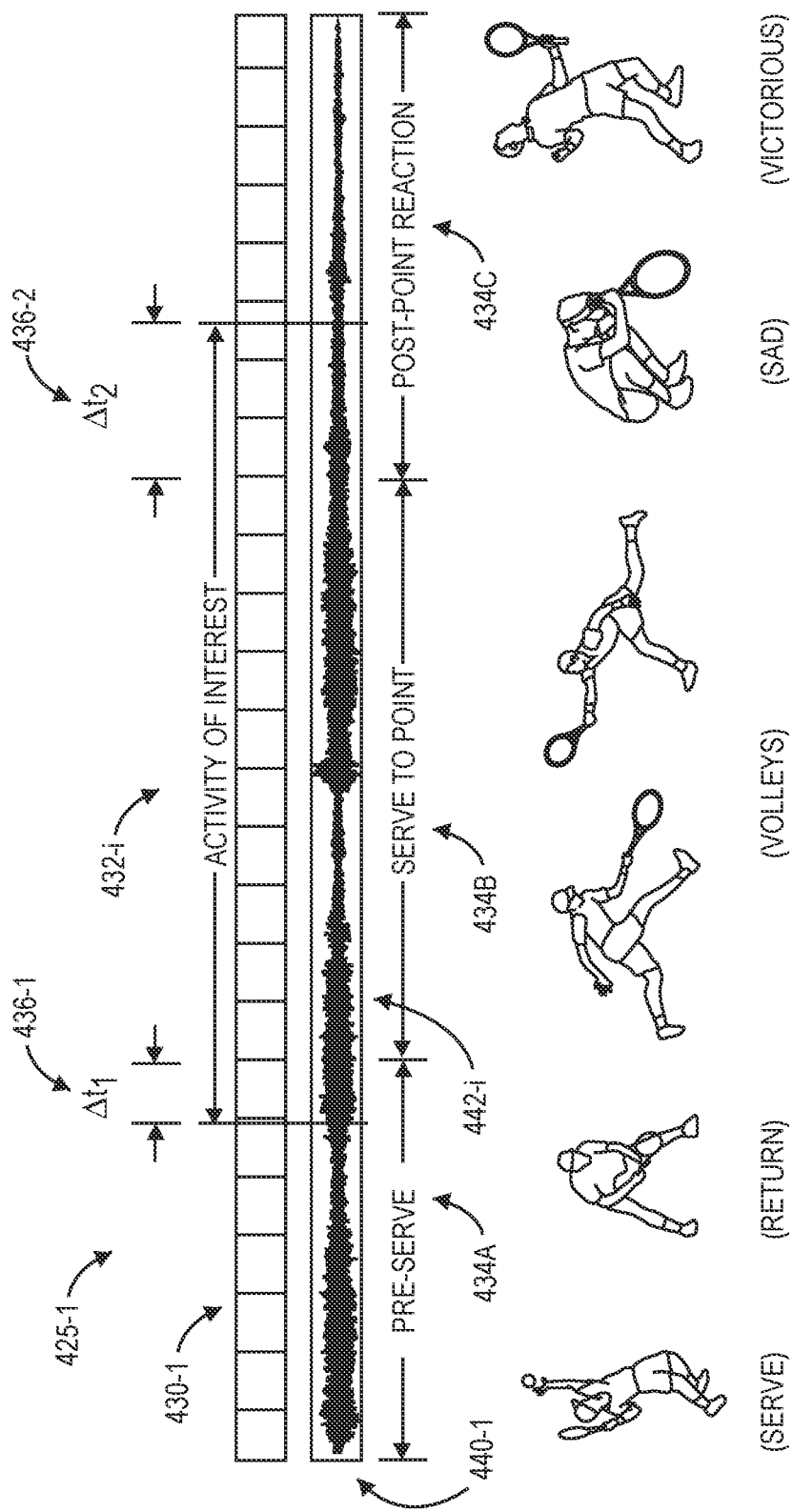

As is shown in FIG. 4B, a multimedia stream 425-1 captured by the camera 415 during the live event includes video signals 430-1 and audio signals 440-1. The multimedia stream 425-1 depicts a plurality of activities or events of interest during the live event, including a pre-serve routine 434A, service and a point 434B, and post-point reactions 434C by the players 405-1, 405-2 or the official 405-3.

As is also shown in FIG. 4B, a portion 432-$i$ of the video signals 430-1 and a portion 442-$i$ of the audio signals 440-1 captured simultaneously with the portion 432-$i$ of the video signals 430-1 may be identified as representing an activity of interest, and may be included in a summary of the live event. The portion 432-$i$ of the video signals 430-1 and the portion 442-$i$ of the audio signals 440-1 include video and audio content, respectively, captured during the service and the point 434B, as well as during a buffer 436-1 having a duration $\Delta t_1$ preceding the service and the point 434B, and a buffer 436-2 having a duration $\Delta t_2$ following the service and the point 434B. Thus, the entirety of the service and the point 434B may be included in a summary of the tennis match, along with a preceding portion of the pre-serve routine 434A and a following portion of the post-point reactions 434C.

Figure 4C:
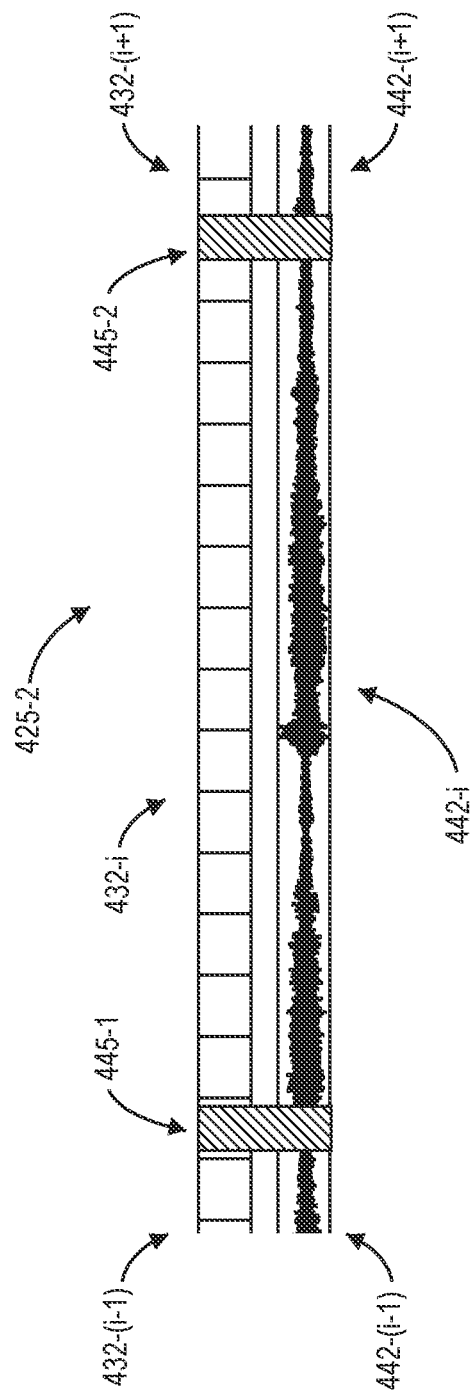

As is shown in FIG. 4C, the portion 432-$i$ of the video signals 430-1 and the portion 442-$i$ of the audio signals 440-1 representing the activity of interest, viz., the service and the point 434B, and the buffers 436-1, 436-2, may be added to a multimedia stream 425-2 representing a summary of the live event. The multimedia stream 425-2 also includes a portion 432-($i$−1) of video signals and a portion 442-($i$−1) of audio signals preceding the portion 432-$i$ of the video signals 430-1 and the portion 442-$i$ of the audio signals 440-1, and a portion 432-($i$+1) of video signals and a portion 442-($i$+1) of audio signals following the portion 432-$i$ of the video signals 430-1 and the portion 442-$i$ of the audio signals 440-1.

In some implementations, a portion of video signals captured by one camera or other recording device or system may be added to the multimedia stream 425-2 along with a portion of audio signals captured by a different camera or other recording device or system. For example, referring again to FIG. 4C, the portion 432-$i$ of the video signals 430-1 may have been captured by one camera, viz., the camera 415, while the portion 442-$i$ of the audio signals 440-1 may have been captured by another camera (not shown). Furthermore, in some implementations, a portion of video signals that is added to the multimedia stream 425-2 need not directly overlap with a portion of audio signals that is also added to the multimedia stream 425-2. For example, the portion 432-$i$ of the video signals 430-1 added to the multimedia stream 425-2 may be shorter or longer than the portion 442-$i$ of the audio signals 440-1.

Moreover, the multimedia stream 425-2 further includes a transition 445-1 between the portion 432-($i$−1) of video signals and the portion 442-($i$−1) of audio signals and the portion 432-$i$ of the video signals 430-1 and the portion 442-$i$ of the audio signals 440-1, and a transition 445-2 of video signals and audio signals between the portion 432-$i$ of the video signals 430-1 and the portion 442-$i$ of the audio signals 440-1 and the portion 432-($i$+1) of video signals and the portion 442-($i$+1) of audio signals. The transitions 445-1, 445-2 may include fades in or out, dissolutions, zooms, cuts, wipes, or any other visual effects, or pans, delays, echoes, reverberations, distortions, compressions, or any other audio effects.

Figure 4D:
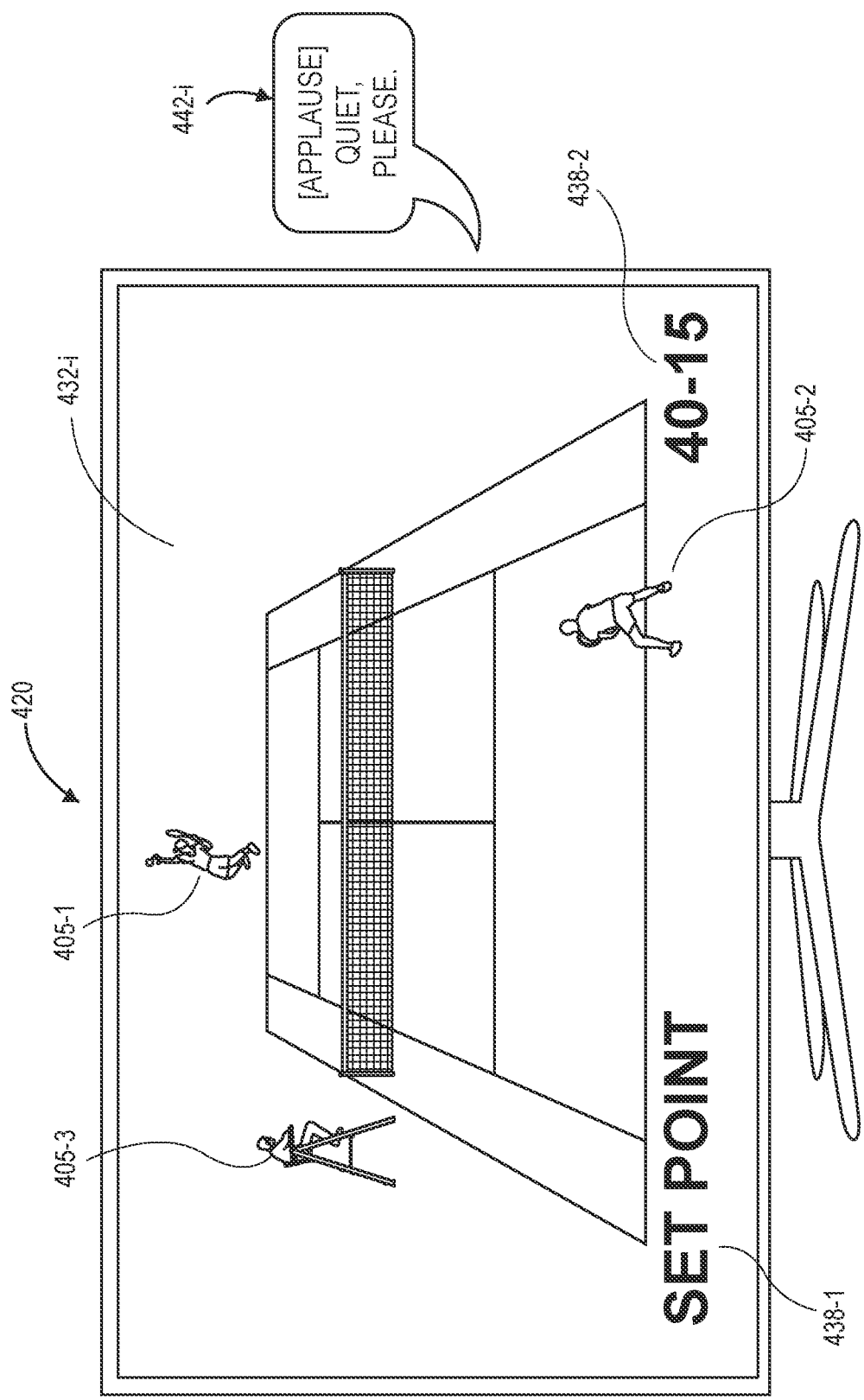

As is shown in FIG. 4D, the multimedia stream 425-2 may be transmitted to a television 420 or any other personal device or system of one or more viewers. The video signals 432-$i$ of the multimedia stream 425-2 may be shown on a display of the television 420, and the audio signals 442-$i$ of the multimedia stream 425-2 may be played by one or more speakers of the television 420. Additionally, the multimedia stream 425-2 further includes a pair of overlays (or layers) 438-1, 438-2 depicting characters or other identifiers of information regarding the multimedia stream 425-2 or the live event, viz., that the video signals 432-$i$ and the audio signals 442-$i$ of the multimedia stream 425-2 represent a set point during the live event, and indicating a score of the live event.

Figure 5A:
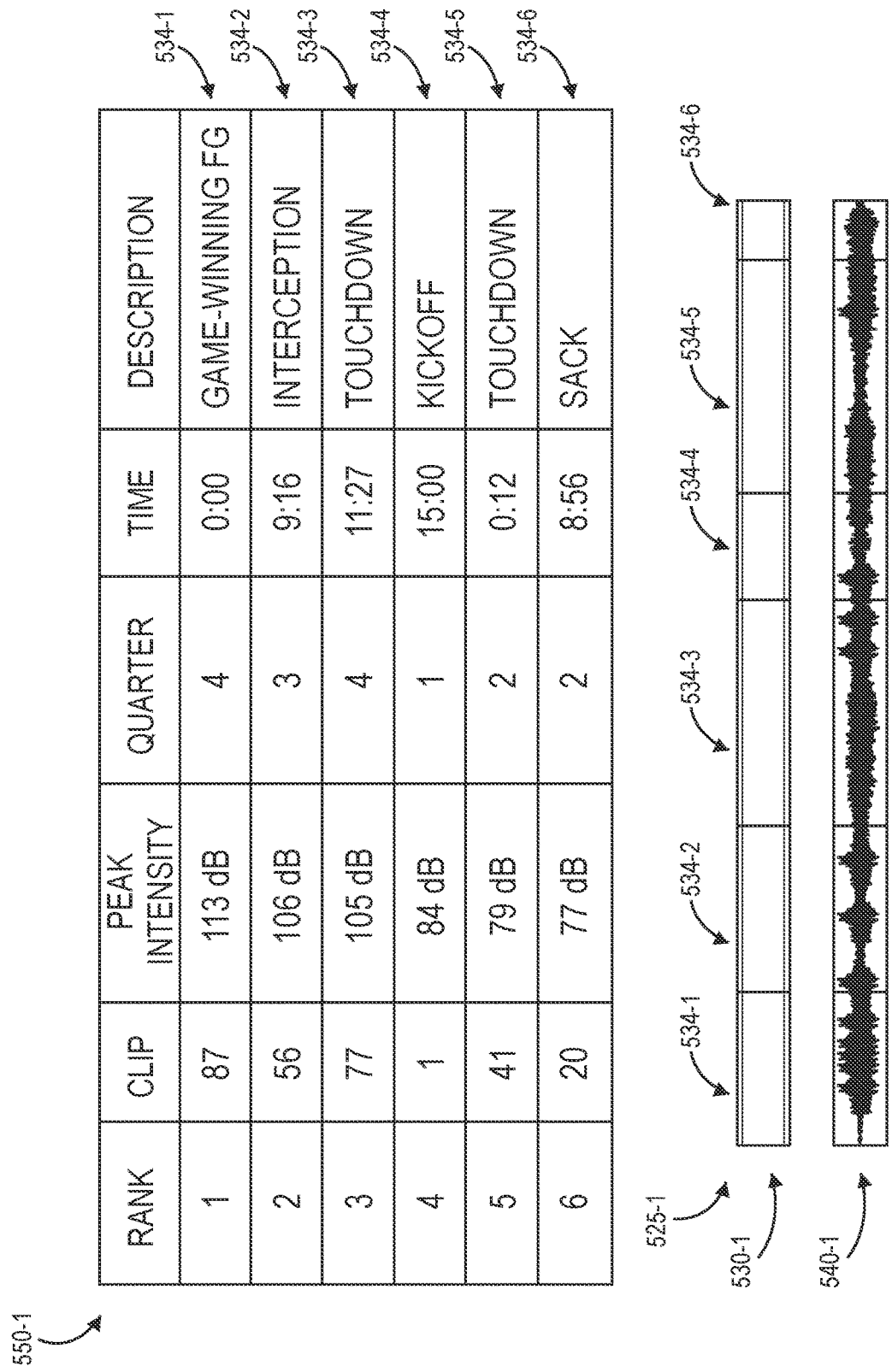
FIGS. 5A and 5B are views of aspects of one system for generating summaries of events in accordance with implementations of the present disclosure.
Figure 5B:
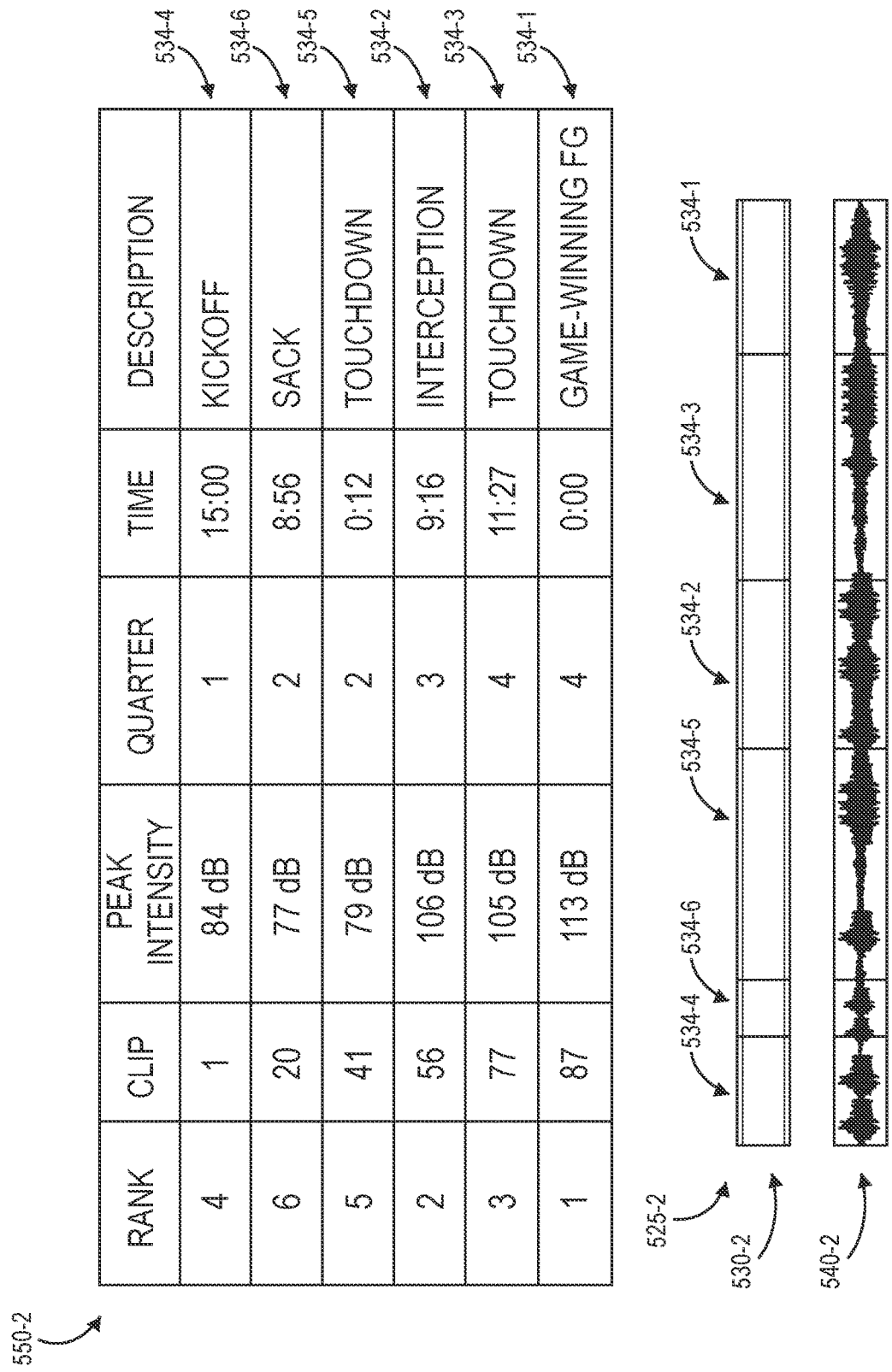

Video signals and audio signals captured during a live event may be arranged in any order in a multimedia stream representing a summary (or a synopsis) of the live event. Referring to FIGS. 5A and 5B, views of aspects of one system for generating summaries of events in accordance with implementations of the present disclosure are shown. Except where otherwise noted, reference numerals preceded by the number "5" shown in FIGS. 5A and 5B indicate components or features that are similar to components or features having reference numerals preceded by the number "4" shown in FIGS. 4A through 4D, by the number "2" shown in FIG. 2 or by the number "1" shown in FIGS. 1A through 1L.

As is shown in FIG. 5A, a set of data 550-1 identifies attributes or features of samples of multimedia identified from multimedia streams captured during a live event, viz., a football game. In particular, the set of data 550-1 ranks activities 534-1, 534-2, 534-3, 534-4, 534-5, 534-6 that occurred during the live event based on their respective peak intensities of audio signals captured during the respective activities. For example, a peak intensity of one hundred thirteen decibels (113 dB) was observed within audio signals captured during an activity 534-1 that occurred with no time remaining in the fourth quarter, e.g., a game-winning field goal. The peak intensity of the audio signals captured during the activity 534-1 ranked greatest of all of the activities 534-1, 534-2, 534-3, 534-4, 534-5, 534-6. The set of data 550-1 may be generated and stored by any computer device or system, e.g., a media distribution system, or any other device or system.

Likewise, as is also shown in FIG. 5A, the set of data 550-1 indicates that a peak intensity of one hundred six decibels (106 dB) was detected within audio signals captured during an activity 534-2 that occurred with nine minutes and sixteen seconds remaining in the third quarter, e.g., an interception, that a peak intensity of one hundred five decibels (105 dB) was detected within audio signals captured during an activity 534-3 that occurred with eleven minutes and twenty-seven seconds remaining in the fourth quarter, e.g., a touchdown, that a peak intensity of eighty-four decibels (84 dB) was detected within audio signals captured during an activity 534-4 that occurred at a start of the game, e.g., a kickoff, that a peak intensity of seventy-nine decibels (79 dB) was detected within audio signals captured during an activity 534-5 that occurred with twelve seconds remaining in the second quarter, e.g., a touchdown, and that a peak intensity of seventy-seven decibels (77 dB) was detected within audio signals captured during an activity 534-6 that occurred with eight minutes and fifty-six seconds remaining in the second quarter, e.g., a sack.

As is further shown in FIG. 5A, a multimedia stream 525-1 representing a summary (or a synopsis) of the live event includes a set of video signals 530-1 captured during the activities 534-1, 534-2, 534-3, 534-4, 534-5, 534-6 and a set of audio signals 540-1 captured concurrently or simultaneously with the set of video signals 530-1. The set of video signals 530-1 and the set of audio signals 540-1 of the multimedia stream 525-1 are arranged in an order of their respective intensities, as is represented in the set of data 550-1. The multimedia stream 525-1 may also include any transitions preceding or following any of the respective video signals 530-1 or the respective audio signals 540-1, or any other visual effects or audio effects.

Alternatively, a multimedia stream generated as a summary (or a synopsis) of the live event may represent the activities having the greatest peak intensities arranged in any other order. As is shown in FIG. 5B, a set of data 550-2 ranks the activities 534-1, 534-2, 534-3, 534-4, 534-5, 534-6 in an order in which the activities occurred within the live event. For example, the activity 534-4, viz., the kickoff, which occurred at a beginning of the live event, is ranked first in the set of data 550-2. Likewise, as is also shown in FIG. 5B, the activities 534-6, 534-5 that occurred during a second quarter of the live event, viz., the sack and one of the touchdowns, are ranked second and third in the set of data 550-2, while the activity 534-2 that occurred within the third quarter, viz., the interception, is ranked fourth, and the activities 534-3, 534-1 that occurred within the fourth quarter, viz., another of the touchdowns and the game-winning field goal, are ranked fifth and sixth, respectively.

As is further shown in FIG. 5B, a multimedia stream 525-2 representing a summary (or a synopsis) of the live event includes a set of video signals 530-2 captured during the activities 534-1, 534-2, 534-3, 534-4, 534-5, 534-6 and a set of audio signals 540-2 captured concurrently or simultaneously with the set of video signals 530-2. The set of video signals 530-2 and the set of audio signals 540-2 of the multimedia stream 525-2 are arranged in an order in which the activities occurred within the live event, as is represented in the set of data 550-2. For example, as is shown in FIG. 5B, the multimedia stream 525-2 includes the video signals and the audio signals captured during the activity 534-4 first, followed by the video signals and the audio signals captured during the activities 534-6, 534-5, 534-2, 534-3, 534-1. The multimedia stream 525-2 may further include any transitions preceding or following any of the respective video signals 530-2 or the respective audio signals 540-2, or any other visual effects or audio effects.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow chart shown in FIG. 3, orders in which such methods or processes are presented are not intended to be construed as any limitation on the claimed inventions, and any number of the method or process steps or boxes described herein can be combined in any order and/or in parallel to implement the methods or processes described herein.

Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, one or two left-most digit(s) of a reference number identify a figure or figures in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method comprising:
   identifying a plurality of multimedia streams captured by a plurality of cameras during an event, wherein each one of the multimedia streams comprises a set of video signals and a set of audio signals captured simultaneously by one of the plurality of cameras;
   determining that each one of a first plurality of sets of video signals depicts at least one of a plurality of activities of the event, wherein each one of the first plurality of the sets of video signals is included in one of the plurality of multimedia streams;
   identifying a first plurality of sets of audio signals, wherein each one of the first plurality of sets of audio signals is included in one of the plurality of multimedia streams with one of the first plurality of sets of video signals;
   determining at least one acoustic characteristic of each one of the first plurality of sets of audio signals;
   selecting a first activity based at least in part on a first acoustic characteristic of a first set of audio signals, wherein the first set of audio signals is included in one of the plurality of multimedia streams with a first set of video signals, and wherein the first set of video signals depicts the first activity;
   generating a first multimedia stream representing at least the first activity, wherein the first multimedia stream comprises the first set of video signals and the first set of audio signals concurrent with the first set of video signals; and
   storing the first multimedia stream in association with the event.

2. The computer-implemented method of claim 1, further comprising:
   identifying metadata associated with the event,
      wherein the metadata comprises identifiers of at least one of:
         a start time of at least one of the plurality of activities;
         an end time of at least one of the plurality of activities;
         a location of at least one of the plurality of activities;
         a participant in at least one of the plurality of activities;
         a time at which a change in a status of the at least one of the plurality of activities occurred;
         the change in the status of the at least one of the plurality of activities; or
         a description of the at least one of the plurality of activities, and
      wherein that each of the first plurality of sets of video signals depicts one of the plurality of activities is determined based at least in part on the metadata.

3. The computer-implemented method of claim 1, wherein the event is a live sporting event, and
   wherein each of the plurality of activities is a play at the live sporting event.

4. The computer-implemented method of claim 1, further comprising:
   determining that each one of a second plurality of sets of video signals depicts one of the plurality of activities of the event, wherein each one of the second plurality of the sets of video signals is included in one of the plurality of multimedia streams;
   identifying a second plurality of sets of audio signals, wherein each one of the second plurality of sets of audio signals is included in one of the plurality of multimedia streams with one of the second plurality of sets of video;
   determining at least one acoustic characteristic of each one of the second plurality of sets of audio signals; and
   determining a ranking of the plurality of activities based at least in part on the at least one acoustic characteristic of each one of the first plurality of sets of audio signals and the at least one acoustic characteristic of each one of the second plurality of sets of audio signals, wherein the first activity is selected based at least in part on the ranking.

5. The computer-implemented method of claim 1, further comprising:

selecting a second activity based at least in part on a second acoustic characteristic of a second set of audio signals, wherein the second set of audio signals is included in one of the plurality of multimedia streams with a second set of video signals, and wherein the second set of video signals depicts the second activity, wherein the first multimedia stream comprises the first set of video signals depicting at least the first activity in series with the second set of video signals depicting at least the second activity, and wherein the first multimedia stream further comprises the first set of audio signals concurrent with the first set of video signals and the second set of audio signals concurrent with the second set of video signals.

6. The computer-implemented method of claim 5, wherein an order of the first set of video signals and the second set of video signals in the first multimedia stream is selected based at least in part on the first acoustic characteristic and the second acoustic characteristic.

7. The computer-implemented method of claim 5, wherein an order of the first set of video signals and the second set of video signals in the first multimedia stream is selected based at least in part on a first time at which the first activity occurred during the event and a second time at which the second activity occurred during the event.

8. The computer-implemented method of claim 5, wherein the first multimedia stream further comprises at least one of:

a video transition between the first set of video signals and the second set of video signals; or an audio transition between the first set of audio signals and the second set of audio signals.

9. The computer-implemented method of claim 5, wherein the first set of video signals was captured by a first camera, and wherein the second set of video signals was captured by a second camera.

10. The computer-implemented method of claim 1, wherein each one of the plurality of cameras is in communication with a media distribution system, and wherein the computer-implemented method further comprises:

broadcasting a second multimedia stream live to at least one personal device over at least one network by the media distribution system, wherein the second multimedia stream comprises at least some of the first plurality of sets of video signals and at least some of the first plurality of sets of audio signals.

11. The computer-implemented method of claim 10, further comprising:

broadcasting at least the first multimedia stream to the at least one personal device over the at least one network by the media distribution system, wherein at least the first multimedia stream is broadcast to the at least one personal device after the second multimedia stream.

12. The computer-implemented method of claim 1, wherein each one of the plurality of cameras is mounted within a venue, and wherein the venue is one of an amphitheater, an arena, an auditorium, a ballpark, a convention center, a resort, a restaurant, a stadium or a theater.

13. The computer-implemented method of claim 1, wherein the event is one of:

a baseball game;
a basketball game;
a concert;
a football game;
a golf match;
a hockey game;
a parade;
a public meeting;
a soccer game;
a social gathering; or
a tennis match.

* * * * *